(12) United States Patent
Ichikawa

(10) Patent No.: US 12,040,633 B2
(45) Date of Patent: *Jul. 16, 2024

(54) WIRELESS POWER TRANSFER USING INDUCTIVE COUPLING

(71) Applicant: MAXELL, LTD., Kyoto (JP)

(72) Inventor: Katsuei Ichikawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,835

(22) Filed: Feb. 2, 2023

(65) Prior Publication Data

US 2023/0187978 A1    Jun. 15, 2023

Related U.S. Application Data

(63) Continuation of application No. 16/300,176, filed as application No. PCT/JP2017/008926 on Mar. 7, 2017, now Pat. No. 11,581,758.

(30) Foreign Application Priority Data

May 12, 2016  (JP) .................................. 2016-095947

(51) Int. Cl.
*H01F 38/14* (2006.01)
*B60L 50/60* (2019.01)
(Continued)

(52) U.S. Cl.
CPC .............. *H02J 50/70* (2016.02); *B60L 50/60* (2019.02); *B60L 53/12* (2019.02); *B60L 53/126* (2019.02);
(Continued)

(58) Field of Classification Search
CPC ...... H01F 38/14; H01F 27/346; H01F 27/006; H02J 50/70; H02J 50/12; H02J 7/025;
(Continued)

(56) References Cited

U.S. PATENT DOCUMENTS 6,176,433 B1    1/2001  Uesaka et al.
2009/0102419 A1  4/2009  Gwon
(Continued)

FOREIGN PATENT DOCUMENTS

JP      11-032452 A     2/1999
JP      2003-037950 A   2/2003
(Continued)

OTHER PUBLICATIONS

Yoshiaki Narusue, et al., "Design of Resonators to Reduce Electromagnetic Leakage for Wireless Power Transfer using Magnetic Resonance", IEICE 2013, pp. 37.
(Continued)

*Primary Examiner* — Tszfung J Chan
(74) *Attorney, Agent, or Firm* — MATTINGLY & MALUR, PC

(57) ABSTRACT

The present invention suppresses leakage magnetic field. A power transfer coil configured to transmit or receive power includes: an inner coil; a first outer coil formed so as to surround the inner coil such that a magnetic flux opposite in phase to a magnetic flux outside the inner coil is generated outside the first outer coil, the first outer coil having one end connected to a first terminal and the other end connected to one end of the inner coil; and a second outer coil formed so as to surround the inner coil such that a magnetic flux opposite in phase to the magnetic flux outside the inner coil is generated outside the second outer coil, the second outer coil having one end connected to a second terminal and the other end connected to the other end of the inner coil.

20 Claims, 23 Drawing Sheets

(51) Int. Cl.
*B60L 53/12* (2019.01)
*B60L 53/126* (2019.01)
*H01F 27/00* (2006.01)
*H01F 27/34* (2006.01)
*H02J 7/00* (2006.01)
*H02J 50/10* (2016.01)
*H02J 50/12* (2016.01)
*H02J 50/70* (2016.01)
*B60M 7/00* (2006.01)

(52) U.S. Cl.
CPC ........ *H01F 27/006* (2013.01); *H01F 27/346* (2013.01); *H01F 38/14* (2013.01); *H02J 7/00* (2013.01); *H02J 7/0042* (2013.01); *H02J 50/10* (2016.02); *H02J 50/12* (2016.02); *B60L 2270/147* (2013.01); *B60M 7/00* (2013.01); *Y02T 10/70* (2013.01)

(58) Field of Classification Search
CPC .. H02J 50/10; H02J 7/00; H02J 7/0042; H02J 50/40; H02J 50/60; H02J 50/80
USPC .................................. 336/200, 232; 307/104
See application file for complete search history.

(56) References Cited

U.S. PATENT DOCUMENTS

| | | | |
|---|---|---|---|
| 2013/0106198 A1* | 5/2013 | Kuk | .............. H01F 41/0246 336/200 |
| 2013/0187474 A1 | 7/2013 | De Boodt | |
| 2014/0008974 A1* | 1/2014 | Miyamoto | .............. H02J 50/60 307/104 |
| 2014/0197694 A1 | 7/2014 | Asanuma et al. | |
| 2015/0042173 A1* | 2/2015 | Lee | .............. H02J 7/00308 307/104 |
| 2015/0137612 A1 | 5/2015 | Yamakawa et al. | |
| 2015/0170830 A1 | 6/2015 | Miyamoto | |
| 2015/0235761 A1 | 8/2015 | Yamakawa et al. | |
| 2015/0318107 A1 | 11/2015 | Hecht | |
| 2017/0093216 A1* | 3/2017 | Cho | .............. H01F 38/14 |
| 2018/0082782 A1 | 3/2018 | Naruse | |
| 2018/0287413 A1* | 10/2018 | Jung | .............. H02J 50/402 |

FOREIGN PATENT DOCUMENTS

| | | |
|---|---|---|
| JP | 2012-244763 A | 12/2012 |
| JP | 2013-243431 A | 12/2013 |
| JP | 2015-012702 A | 1/2015 |
| JP | 2015-015852 A | 1/2015 |
| JP | 2015-089259 A | 5/2015 |
| WO | 2013/179639 A1 | 12/2013 |
| WO | 2015/125295 A1 | 8/2015 |
| WO | 2016/162964 A1 | 10/2016 |

OTHER PUBLICATIONS

International Search Report of PCT/JP2017/008926 dated Jun. 13, 2017.

* cited by examiner

WIRELESS POWER TRANSFER USING INDUCTIVE COUPLING

CROSS REFERENCE TO RELATED APPLICATIONS

This application is a continuation of U.S. patent application Ser. No. 16/300,176, filed Nov. 9, 2018, which is a U.S. National Phase application under 35 U.S.C. § 371 of International Application No. PCT/JP2017/008926, filed Mar. 7, 2017, which claims benefit of priority to Japanese Application No. 2016-095947, filed May 12, 2016. The contents of the above applications are hereby incorporated by reference.

TECHNICAL FIELD

The present invention relates to a power transfer coil. The present invention claims priority from Japanese Patent Application No. 2016-95947 filed on May 12, 2016, the contents of which are incorporated herein by reference for the designated states where incorporation by reference of documents is allowed.

BACKGROUND ART

Patent Document 1 discloses a coil antenna comprising a main coil formed by winding a conductor wire about a reference axis, and an auxiliary coil arranged so as to be spaced apart from the main coil at a predetermined interval as well as being electrically connected in series to the main coil such that the same alternating current as that flowing in the main coil is flowed therein.

RELATED ART DOCUMENTS

Patent Documents

Patent Document 1: Japanese Unexamined Patent Application Publication No. 2015-15852

SUMMARY OF THE INVENTION

Problems to be Solved by the Invention

When transmitting power by using inductive coupling, leakage magnetic field occurs from a power transmitting coil or a power receiving coil. Leakage magnetic field is likely to cause interference on other electronic devices and may also affect the human body.

Patent Document 1 discloses a configuration in which an auxiliary coil is arranged so as to be spaced apart from a main coil at a predetermined interval in a direction of a reference axis, so that leakage magnetic field is suppressed.

Accordingly, an object of the present invention is to provide a technique in which leakage magnetic field is suppressed.

Means for Solving the Problems

The present application includes several means for solving at least a portion of the problems described above, and examples thereof are as follows. In order to solve the problems described above, a power transfer coil according to the present invention comprises: an inner coil; a first outer coil formed so as to surround the inner coil such that a magnetic flux opposite in phase to a magnetic flux outside the inner coil is generated outside the first outer coil, the first outer coil having one end connected to a first terminal and the other end connected to one end of the inner coil; and a second outer coil formed so as to surround the inner coil such that a magnetic flux opposite in phase to the magnetic flux outside the inner coil is generated outside the second outer coil, the second outer coil having one end connected to a second terminal and the other end connected to the other end of the inner coil.

Effects of the Invention

According to the present invention, leakage magnetic field can be suppressed. Problems, configurations and effects other than those described above will be made clear by descriptions of the embodiments described below.

DETAILED DESCRIPTION OF PREFERRED EMBODIMENTS

Hereinafter, embodiments of the present invention will be described with reference to the drawings.

Connecting to a connector to charge a portable device such as a mobile device has become more troublesome as the devices have become smaller and thinner, and thus, there is a growing demand to perform charging by wireless power transfer. In addition, using a wire to charge an electric vehicle while raining or the like would allow water to enter the connector and cause possible deterioration of its junction, and thus, it is preferable to perform charging by wireless power transfer. Further, a care receiver or the like would have difficulties in connecting a wire to a connector to charge a device such as a stair elevator or a movable lift for nursing care use, and thus, it is preferable to perform charging by wireless power transfer.

Studies are being conducted on wireless power transfer using radio waves such as microwaves and wireless power transfer using inductive coupling (electromagnetic induction). Wireless power transfer using microwaves provides excellent transmission distance but is poor in transmission efficiency, making it hardly suitable for practical use. In contrast, wireless power transfer using inductive coupling provides a transmission distance of a few to ten-odd centimeters but can achieve a high transmission efficiency of approximately 90% for the coils used in transmitting and receiving power. For this reason, it is considered that transmitting power using inductive coupling would become the mainstream for wireless power transfer.

Power transmitting frequencies used for inductive coupling include bands of 100 kHz, 400 kHz, 6.78 MHz, 13.56 MHz and the like. Wireless power transfer using inductive coupling provides a transmission distance that is relatively short but allows leakage magnetic field to occur from the power transmitting coil or the power receiving coil. When considering adverse effects on other electronic devices and on the human body, it is necessary to suppress this leakage magnetic field as low as possible.

First Embodiment

Figure 1:
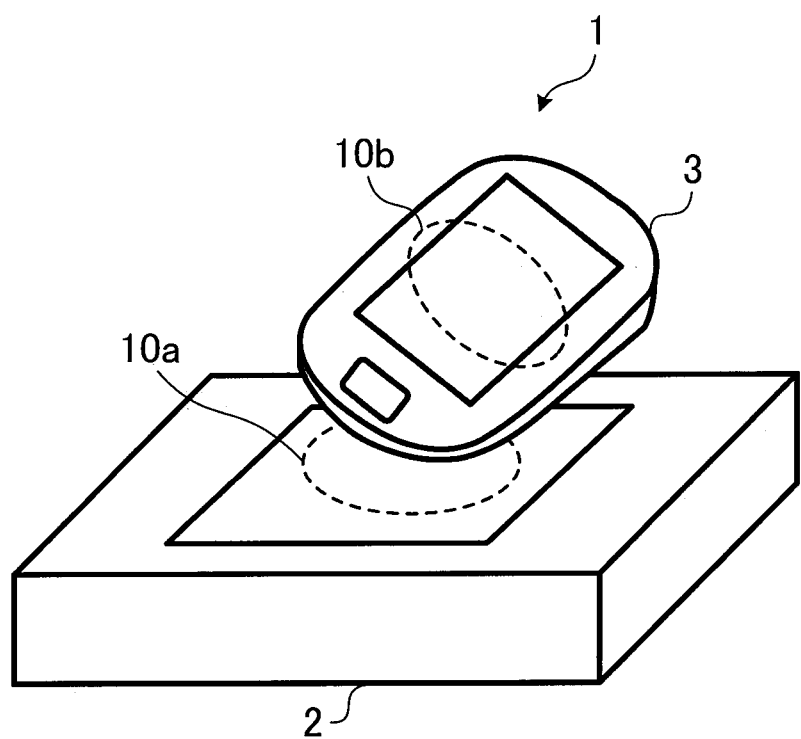
FIG. 1 is a drawing showing an example of a wireless power transfer system according to a first embodiment.

FIG. 1 is a drawing showing an example of a wireless power transfer system 1 according to a first embodiment. As shown in FIG. 1, the wireless power transfer system 1 includes a charger 2 and a mobile device 3.

The mobile device 3 to be charged with power is placed above the charger 2. The charger 2 has a built-in power transfer coil 10a configured to transmit power to the mobile device 3.

The mobile device 3 is a smartphone, a tablet computer, a mobile phone or the like. The mobile device 3 has a built-in power transfer coil 10b configured to receive the power from the charger 2.

The power transfer coils 10a and 10b have the same shape and configuration. Therefore, when there is no need to distinguish between the power transfer coils 10a and 10b, the coils will be collectively referred to as power transfer coil 10 hereinafter. Note that there are cases where the power transfer coils 10a and 10b have different shapes and configurations as described below.

Figure 2:
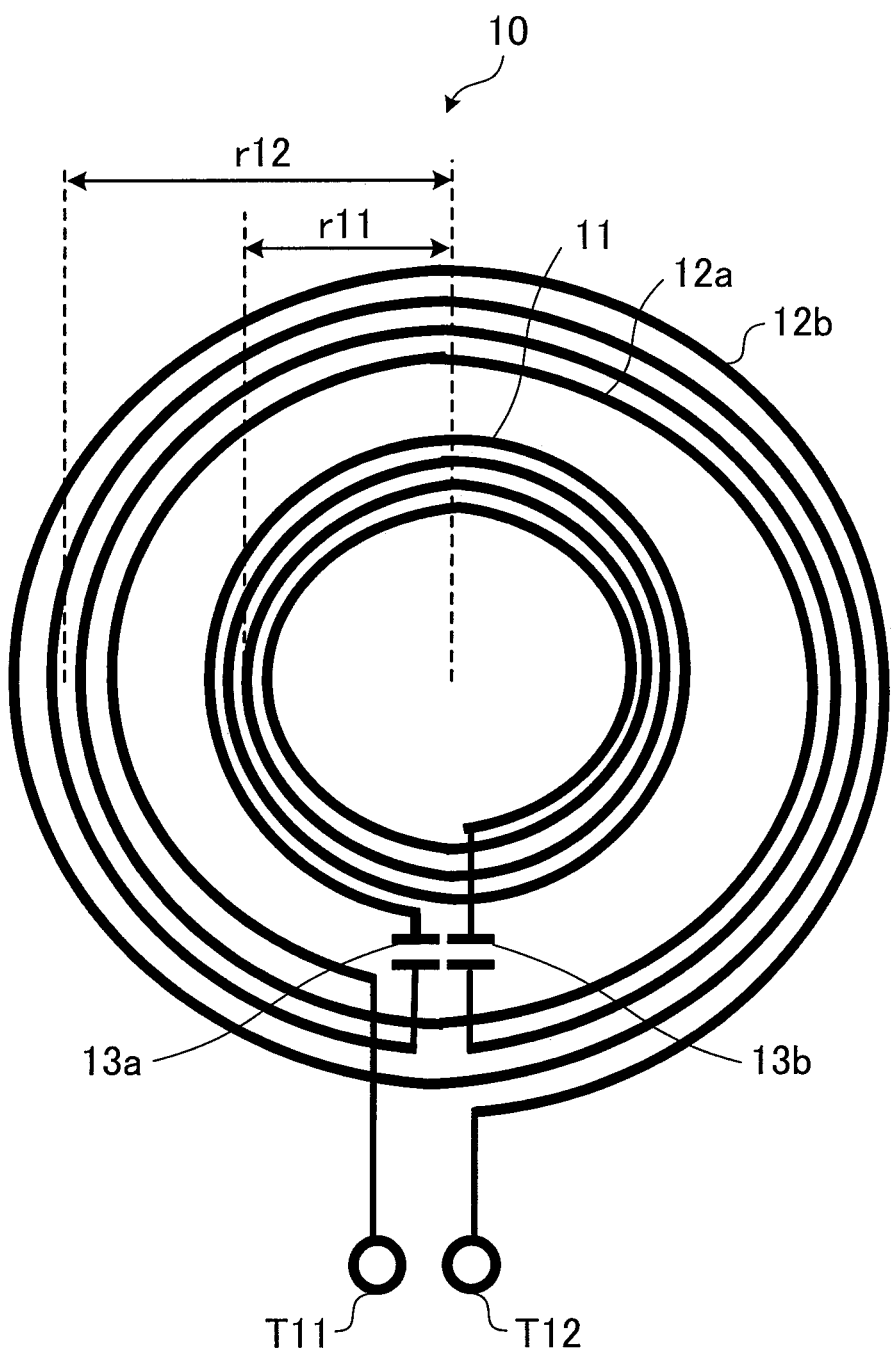
FIG. 2 is a drawing showing a configuration example of a power transfer coil.

FIG. 2 is a drawing showing a configuration example of the power transfer coil 10. As shown in FIG. 2, the power transfer coil 10 includes terminals T11 and T12, an inner coil 11, outer coils 12a and 12b, and capacitor elements 13a and 13b. The inner coil 11 and the outer coils 12a and 12b are formed on the same planar surface (including substantially same planar surface; the same applies to the term hereinafter). Note that, although FIG. 2 shows the inner coil 11 and the outer coils 12a and 12b each wound so as to have gaps therebetween, the coils are actually wound more tightly. The same applies to the coils described below.

The outer coils 12a and 12b have the same shape (including substantially same shape; the same applies to the term hereinafter) and are arranged at the same position. The outer coils 12a and 12b have a circular shape with its radius denoted as "r12".

The inner coil 11 has a circular shape with its radius denoted as "r11" which is smaller than the radius "r12" of the outer coils 12a and 12b (r11<r12). The inner coil 11 is formed inside a loop of the outer coils 12a and 12b.

The inner coil 11 is connected between the outer coils 12a and 12b via the capacitor elements 13a and 13b. A combined capacitance of the capacitor elements 13a and 13b is a value that resonates with a combined self-inductance of the inner coil 11 and outer coils 12a and 12b at a power transmitting frequency.

The outer coil 12a is formed so as to surround the inner coil 11. The outer coil 12a is formed such that a magnetic flux opposite in phase to a magnetic flux outside the inner coil 11 is generated outside the outer coil 12a.

For example, the outer coil 12a is formed such that a current is flowed in a direction opposite to a current flowing in the inner coil 11. More specifically, in a case where the current is flowing in the inner coil 11 in a clockwise direction, the outer coil 12a is formed such that the current is flowed in a counterclockwise direction.

The outer coil 12b is formed so as to surround the inner coil 11. The outer coil 12b is formed such that a magnetic flux opposite in phase to the magnetic flux outside the inner coil 11 is generated outside the outer coil 12b.

For example, the outer coil 12b is formed such that a current is flowed in a direction opposite to the current flowing in the inner coil 11. More specifically, in a case where the current is flowing in the inner coil 11 in the clockwise direction, the outer coil 12b is formed such that a current is flowed in the counterclockwise direction.

The outer coil 12a has one end connected to the terminal T11 and the other end connected to the capacitor element 13a. The outer coil 12b has one end connected to the terminal T12 and the other end connected to the capacitor element 13b. A current for generating a magnetic field in the inner coil 11 and outer coils 12a and 12b is fed to the terminals T11 and T12.

The power transfer coil 10 is formed so as to be symmetrical (linearly symmetrical) when viewed from one end of the outer coil 12a connected to the terminal T11 and one end of the outer coil 12b connected to the terminal T12.

Figure 3:
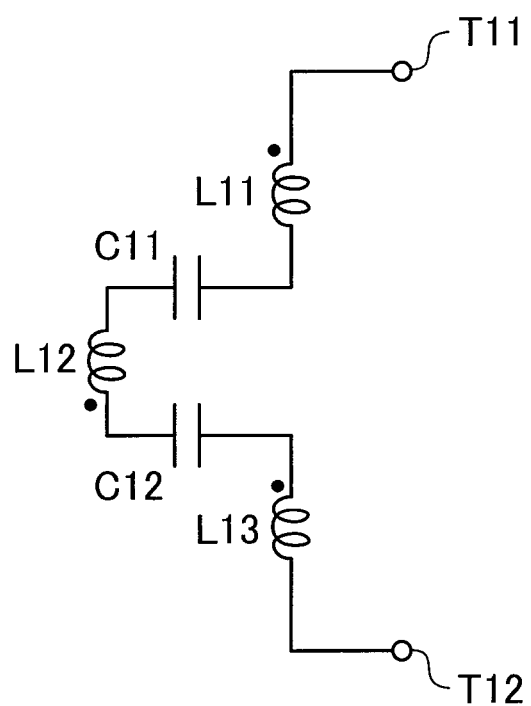
FIG. 3 is a drawing showing an equivalent circuit of the power transfer coil.

FIG. 3 is a drawing showing an equivalent circuit of the power transfer coil 10. FIG. 3 shows the terminals T11 and T12 of FIG. 2.

An inductor L11 of FIG. 3 corresponds to the outer coil 12a of FIG. 2. A capacitor element C11 of FIG. 3 corresponds to the capacitor element 13b of FIG. 2. An inductor L12 of FIG. 3 corresponds to the inner coil 11 of FIG. 2. A capacitor element C12 of FIG. 3 corresponds to the capacitor element 13a of FIG. 2. An inductor L13 of FIG. 3 corresponds to the outer coil 12b of FIG. 2.

As shown in FIG. 3, the equivalent circuit of the power transfer coil 10 is also formed so as to be symmetrical (arrangement of elements are linearly symmetrical) when viewed from one end of the outer coil 12a connected to the terminal T11 and one end of the outer coil 12b connected to the terminal T12.

Here, a relation between sizes of the inner coil 11 and outer coils 12a and 12b and a relation between the numbers of turns of the inner coil 11 and outer coils 12a and 12b will be described.

Figure 4:
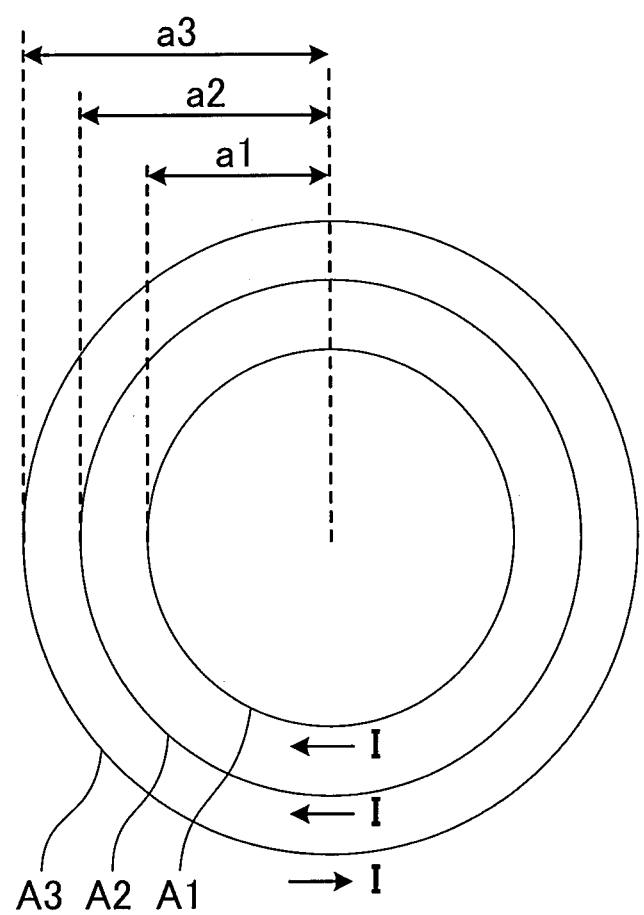
FIG. 4 is a drawing describing a relation between the sizes of an inner coil and outer coils and a relation between the numbers of turns of the inner coil and outer coils.

FIG. 4 is a drawing describing the relation between the sizes of the inner coil 11 and outer coils 12a and 12b and the relation between the numbers of turns of the inner coil 11 and outer coils 12a and 12b.

FIG. 4 shows current loops A1, A2 and A3. Radii of the current loops A1, A2 and A3 are respectively denoted as "a1", "a2" and "a3". In this example, a high frequency current I is flowing in the current loops A1 and A2 in the clockwise direction, and a high frequency current I is flowing in the current loop A3 in a direction opposite (counterclockwise direction) to the current loops A1 and A2.

Magnitude of the magnetic field generated by the current loop A1 is proportional to an area of the current loop A1 and the current flowing in the current loop A1. In other words, the magnitude of the magnetic field generated by the current loop A1 is proportional to "$a1^2 \times I$".

Thus, a condition to cancel leakage magnetic field in a far field of the current loops A1, A2 and A3 is obtained by the following equation (1), considering the direction of the current:

based on $(a1^2+a2^2-a3^2)I=0$, $$a1^2+a2^2-a3^2=0 \quad (1)$$

In a case where the radii of the inner and middle current loops A1 and A2 are equal to each other, the condition to cancel leakage magnetic field in the far field of the current loops A1, A2 and A3 is obtained by the following equation (2), where "a1=a2" is satisfied in equation (1):

based on $2a1^2=a3^2$, $$a3=2^{1/2} \times a1 \quad (2)$$

From the above, leakage magnetic field can be cancelled in the far field by flowing a doubled high frequency current I in the current loop A1 having the radius "a1" and by flowing a high frequency current I in the current loop A3 having the radius "$2^{1/2} \times a1$" in the opposite direction.

Note that the region farther than $\lambda/(2\pi)$ from a magnetic field source is referred to as the far field, and the region closer than this is referred to as a near field. "$\lambda$" denotes a wavelength of the power to be wirelessly transferred. For example, in a case where the power transmitting frequency is 10 MHz, a boundary between the far field and the near field is 4.8 m.

By applying the above-described conditions to the power transfer coil 10 of FIG. 2, leakage magnetic field in the far field of the power transfer coil 10 can be suppressed. For example, the radius "r12" of the outer coils 12a and 12b of FIG. 2 is set to be $2^{1/2}$ times (including approximately $2^{1/2}$ times; the same applies to the term hereinafter) as large as the radius "r11" of the inner coil 11. In addition, the coils are wound such that the current flowing in the inner coil 11 is twice as large as the current flowing in the outer coils 12a and 12b. For example, the coils are wound such that the number of turns of the inner coil 11 is twice (including approximately twice; the same applies to the term hereinafter) as large as the sum of the number of turns of the outer coil 12a and the number of turns of the outer coil 12b. Thus, leakage magnetic field in the far field of the power transfer coil 10 is suppressed.

Effects caused by leakage magnetic field that occurs at the time of wireless power transfer is regarded critical in a case where other electronic devices and the like are placed at a relatively short distance of tens of centimeters to a few meters from the power transfer coil 10. For this reason, it is also important to suppress leakage magnetic field in the near field.

Since the distance from the coil is short in the near field, it is considered that the shape of the coil and the like would affect leakage magnetic field as well. By providing the configuration of the power transfer coil 10 shown in FIG. 2, leakage power in the near field can also be suppressed. In particular, the power transfer coil 10 is formed so as to be symmetrical when viewed from one end of each of the outer coils 12a and 12b respectively connected to the terminals T11 and T12, so that an effect of suppressing leakage magnetic field in the near field is enhanced. In addition, the equivalent circuit of the power transfer coil 10 is also formed so as to be symmetrical, so that the effect of suppressing leakage magnetic field in the near field is further enhanced.

Figure 5:
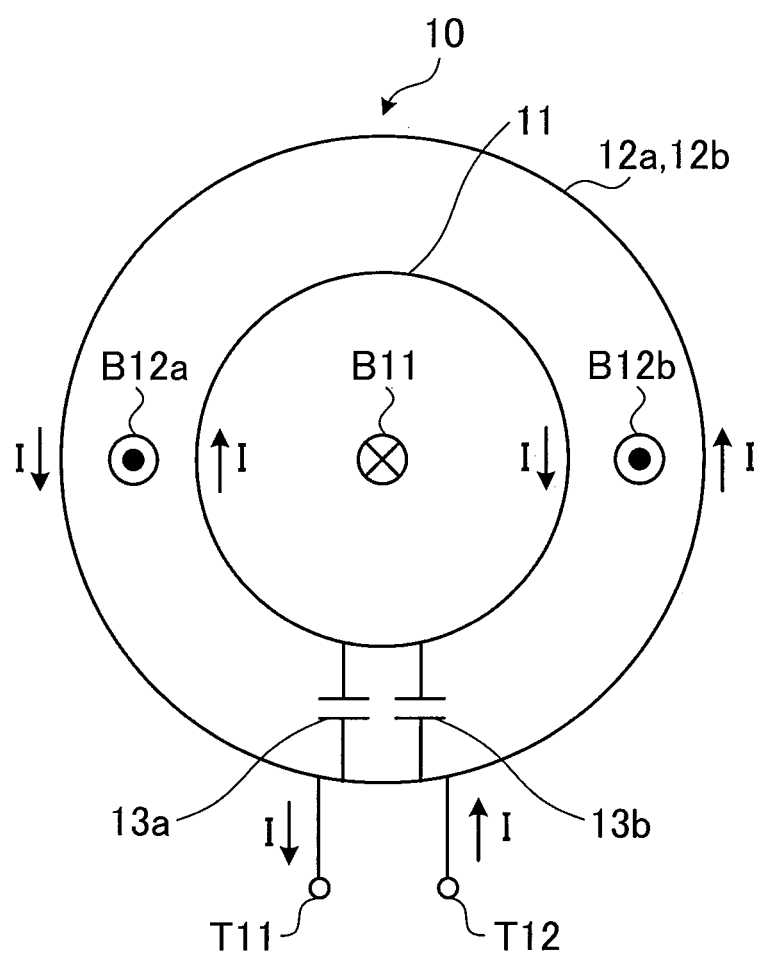
FIG. 5 is a drawing describing a magnetic field generated by the power transfer coil.

FIG. 5 is a drawing describing the magnetic field generated by the power transfer coil 10. FIG. 5 shows the power transfer coil 10 of FIG. 2 in a simplified manner. In FIG. 5, components that are the same as those shown in FIG. 2 are denoted by the same reference signs.

As shown in FIG. 5, in a case where current I is fed from the terminal T12, a magnetic flux generated by the inner coil 11 and a magnetic flux generated by the outer coils 12a and 12b cause a magnetic flux as in a magnetic flux B11 shown in FIG. 5 extending from the front side of the drawing plane toward the back side of the drawing plane to be generated inside the inner coil 11.

Further, the magnetic flux generated by the inner coil 11 and the magnetic flux generated by the outer coils 12a and 12b cause a magnetic flux as in magnetic fluxes B12a and B12b shown in FIG. 5 extending from the back side of the drawing plane toward the front side of the drawing plane to be generated between the inner coil 11 and the outer coils 12a and 12b.

Figure 15:
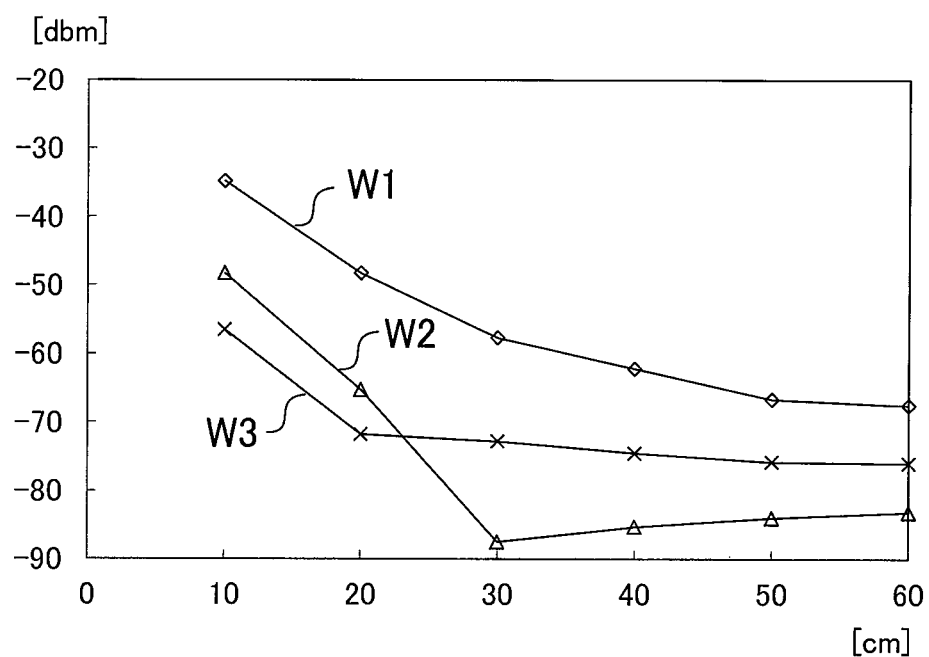
FIG. 15 is a graph showing a relation between a distance from a power transfer coil and a magnitude of leakage magnetic field.

The magnetic flux generated by the inner coil 11 and the magnetic flux generated by the outer coils 12a and 12b cause the magnetic flux outside the outer coils 12a and 12b to be "0" (including approximately 0; the same applies to the term hereinafter). Namely, the power transfer coil 10 suppresses leakage magnetic field in its near field as well. Measurement results regarding a magnitude of leakage magnetic field with respect to distance from the power transfer coil 10 will be described below (FIG. 15).

In wireless power transfer using inductive coupling, coupling between the power transfer coils at a power supplying end and power receiving end increases as the numbers of turns of the power transfer coils increase, so that power transmission efficiency is enhanced. However, an increase in the numbers of turns of the power transfer coils causes an increase in parasitic capacitance between the coils which further leads to a decrease in a self-resonant frequency determined by this parasitic capacitance and self-inductance of the power transfer coils. For this reason, a frequency range that can be used for the power transmitting frequency is decreased by the decreased amount of the self-resonant frequency. In addition, a decrease in self-resonant frequency causes a Q factor (sharpness) of the coil to deteriorate.

However, the power transfer coil 10 is provided with the capacitor elements 13a and 13b connected between the inner coil 11 and the outer coils 12a and 12b. By providing the capacitor elements 13a and 13b, an electric charge that accumulates between the turns of the coils which cause parasitic capacitance of the power transfer coil 10 is accumulated in the capacitor elements 13a and 13b, so that parasitic capacitance is less likely to occur between the coils. Thus, in the power transfer coil 10, a decrease in the self-resonant frequency can be suppressed, so that the numbers of turns of the inner coil 11 and outer coils 12a and 12b can be increased. In other words, the power transfer coil 10 allows coupling between the coils to be increased, so that transmission efficiency is enhanced.

Further, for wireless power transfer using inductive coupling, when the shapes of the power transfer coils at the power supplying end and power receiving end are the same, coupling between the power transfer coils is increased, so that transmission efficiency is enhanced. However, there may be a case where the shapes of the power transfer coils at the power supplying end and power receiving end differ from each other. For example, there may be a case where the charger 2 shown in FIG. 1 has various mobile devices 3 placed thereon, the mobile devices 3 each having a power transfer coil of different shape.

Figure 6:
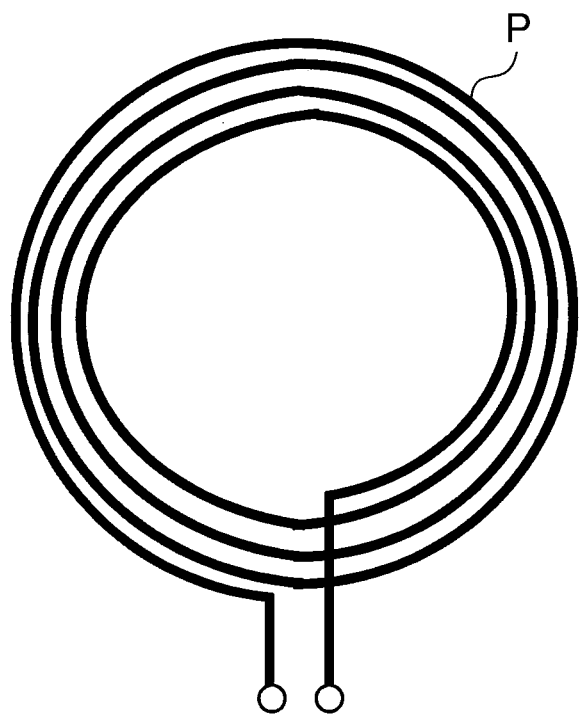
FIG. 6 is a drawing showing an example of another power transfer coil.

FIG. 6 is a drawing showing an example of another power transfer coil P. The power transfer coil P shown in FIG. 6 is a circular coil simply wound in one direction. The power transfer coil P configured to receive the power is an example of a coil at a power receiving end.

Figure 7:
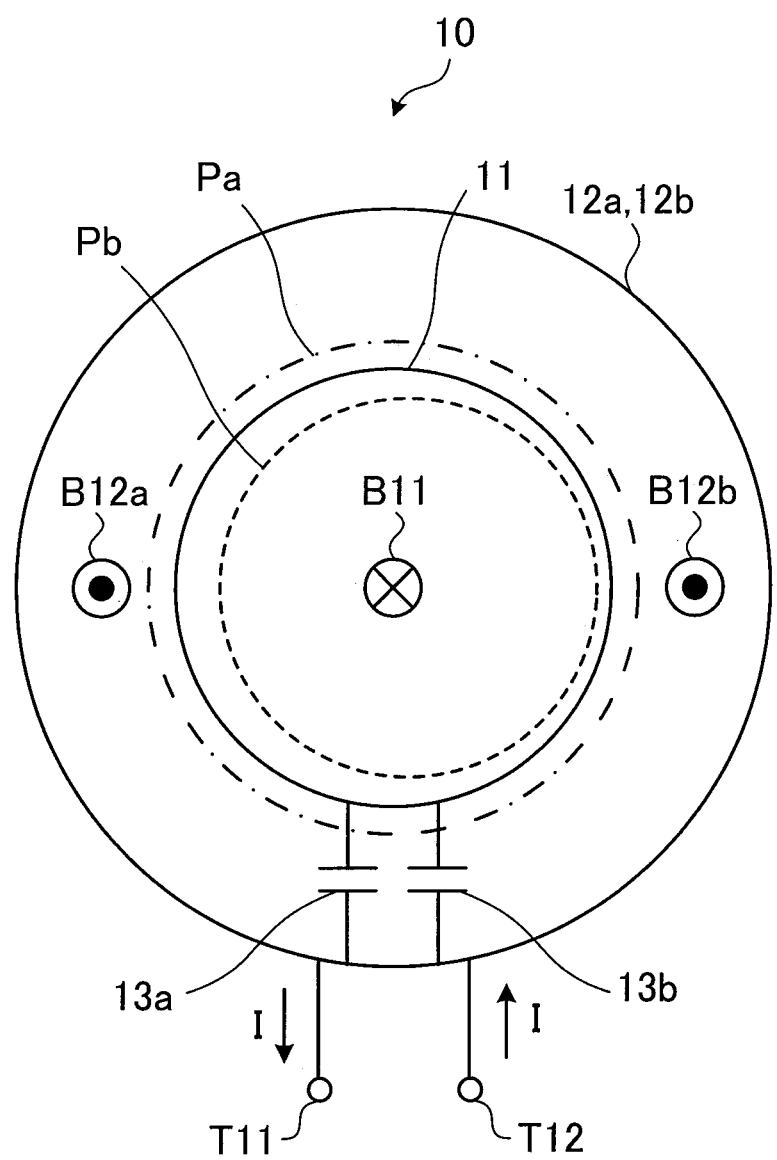
FIG. 7 is a drawing describing a power receiving process of the power transfer coil of FIG. 6.

FIG. 7 is a drawing describing a power receiving process of the power transfer coil P of FIG. 6. FIG. 7 shows the power transfer coil 10 of FIG. 5 in a simplified manner. In addition, FIG. 7 shows the power transfer coil P (power transfer coils Pa and Pb of different size) of FIG. 6 in a simplified manner.

In FIG. 7, the power transfer coil 10 configured to transmit power is a power transfer coil at the power supplying end (charger 2), and the power transfer coils Pa and Pb configured to receive the power are power transfer coils at the power receiving end (mobile device 3). Hereinafter, when there is no need to distinguish between the power transfer coils Pa and Pb, the coils will be collectively referred to as the power transfer coil P.

It is preferable that the inner coil 11 of the power transfer coil 10 at the power supplying end is larger than the power transfer coil P at the power receiving end. For example, in a case where the inner coil 11 is smaller than the power transfer coil Pa denoted by a dot-and-dash line at the power receiving end, the magnetic flux B11 and the magnetic fluxes B12a and B12b opposite in phase to the magnetic flux B11 enter the power transfer coil Pa denoted by a dot-and-dash line. This allows a decrease in the power transmission efficiency of the power transfer coil Pa denoted by the dot-and-dash line at the power receiving end.

On the other hand, in a case where the inner coil 11 is larger than the power transfer coil Pb denoted by a dotted line at the power receiving end, only the unidirectional magnetic flux B11 enters the power transfer coil Pb denoted by the dotted line as long as the power transfer coil Pb is arranged inside the inner coil 11. Namely, the magnetic fluxes B12a and B12b opposite in phase to the magnetic flux B11 do not enter the power transfer coil Pb denoted by the dotted line. This allows the power transfer coil Pb denoted by the dotted line to suppress a decrease in power transmission efficiency by the power transfer coil Pa denoted by the dot-and-dash line.

In this manner, it is possible to provide a configuration in which the power transfer coil at the power supplying end is the power transfer coil 10 and the power transfer coil at the power receiving end is the power transfer coil P that differs from the power transfer coil 10. In this case, the inner coil 11 of the power transfer coil 10 is set to be larger than the power transfer coil P in order to suppress a decrease in power transmission efficiency.

Nevertheless, optimum power transmission efficiency can be achieved when the power transfer coil at the power receiving end is identical to the power transfer coil 10 at the power supplying end (that is, when the power transfer coil at the power receiving end is another power transfer coil 10). For example, the magnetic flux B11 shown in FIG. 7 is received by the inner coil 11 of the power transfer coil 10 at the power receiving end, and the magnetic fluxes B12a and B12b are received by a loop (space) between the inner coil 11 and the outer coils 12a and 12b of the power transfer coil 10 at the power receiving end, so that optimum power transmission efficiency can be achieved.

As described above, the power transfer coil 10 includes: the outer coil 12a formed so as to surround the inner coil 11 such that a magnetic flux opposite in phase to the magnetic flux outside the inner coil 11 is generated outside the outer coil 12a, the outer coil 12a having one end connected to the terminal T11 and the other end connected to one end of the inner coil 11; and the outer coil 12b formed so as to surround the inner coil 11 such that a magnetic flux opposite in phase to the magnetic flux outside the inner coil 11 is generated outside the outer coil 12b, the outer coil 12b having one end connected to the terminal T12 and the other end connected to the other end of the inner coil 11. Thus, the power transfer coil 10 can suppress leakage magnetic field in the far field and near field.

In addition, the inner coil 11 and the outer coils 12a and 12b of the power transfer coil 10 are each formed so as to be symmetrical when viewed from one end of the outer coil 12a and one end of the outer coil 12b. Further, the equivalent circuit of the power transfer coil 10 is also formed so as to be symmetrical when viewed from one end of the outer coil 12a and one end of the outer coil 12b. Thus, the power transfer coil 10 can suppress leakage magnetic field in the near field.

In addition, a current approximately twice as large as the sum of the current flowing in the outer coil 12a and the current flowing in the outer coil 12b is flowed in the inner coil 11 of the power transfer coil 10. Further, the radius of the outer coils 12a and 12b is approximately $2^{1/2}$ times as large as the radius of the inner coil 11. Thus, the power transfer coil 10 can suppress leakage magnetic field in the near field.

In addition, the power transfer coil 10 includes the capacitor element 13a connected between the inner coil 11 and the outer coil 12a, and the capacitor element 13b connected between the inner coil 11 and the outer coil 12b. Thus, the power transfer coil 10 can suppress a decrease in the self-resonant frequency.

In addition, the power transfer coil 10 has the inner coil 11 and outer coils 12a and 12b formed on the same planar surface, so that miniaturization can be achieved.

Second Embodiment

In the first embodiment, the inner coil 11 is connected between two outer coils 12a and 12b. In a second embodiment, the outer coil is connected between two inner coils.

Figure 8:
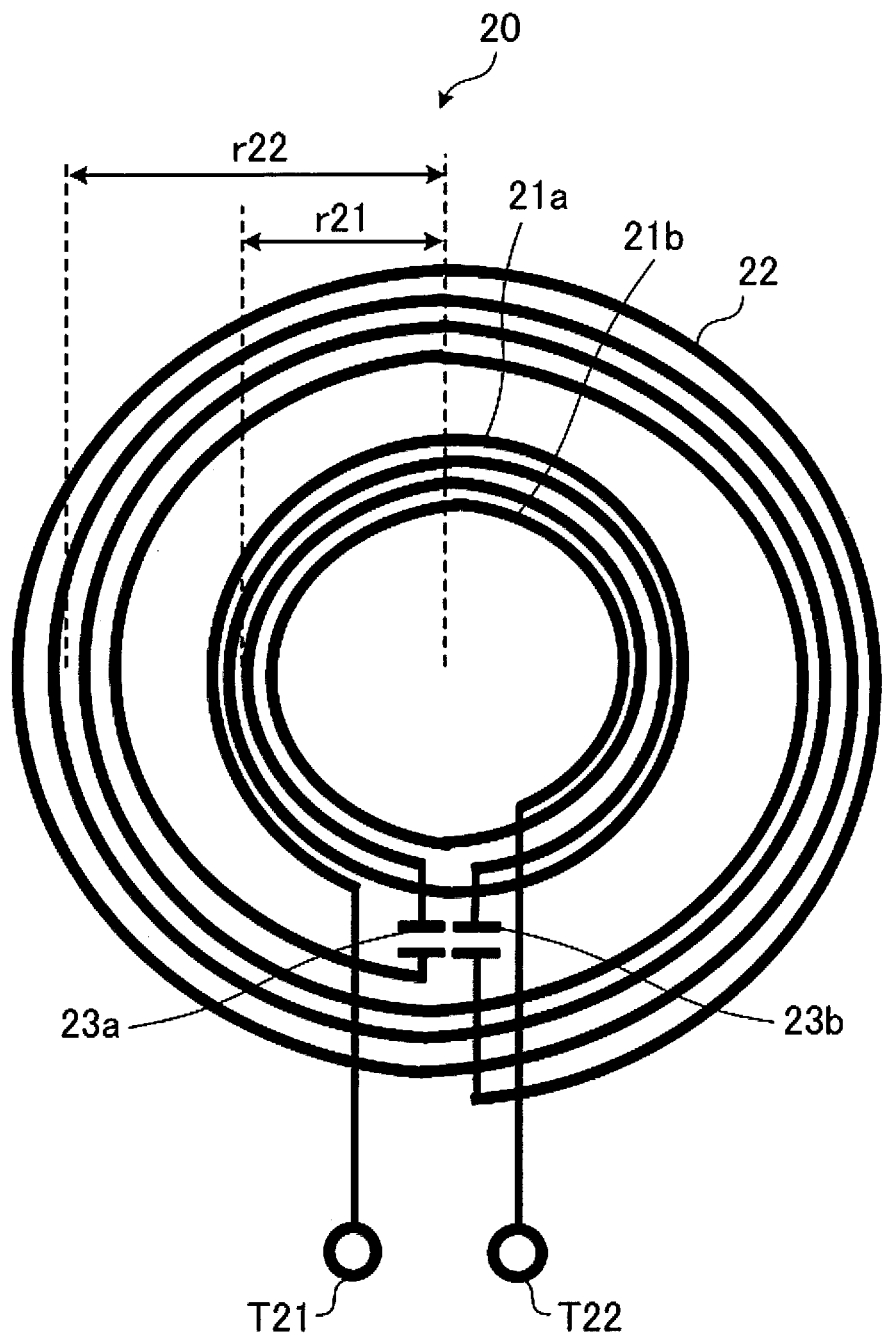
FIG. 8 is a drawing showing a configuration example of a power transfer coil according to a second embodiment.

FIG. 8 is a drawing showing a configuration example of a power transfer coil 20 according to the second embodiment. As shown in FIG. 8, the power transfer coil 20 includes terminals T21 and T22, inner coils 21a and 21b, an outer coil 22, and capacitor elements 23a and 23b. The inner coils 21a and 21b and the outer coil 22 are formed on the same planar surface. The power transfer coil 20 is applied to a power supplying device (such as the charger 2 of FIG. 1) configured to transmit power or a power receiving device (such as the mobile device 3 of FIG. 1) configured to receive the power.

The inner coils 21a and 21b have the same shape and are arranged at the same position. The inner coils 21a and 21b have a circular shape with its radius denoted as "r21".

The inner coil 21a has one end connected to the terminal T21 and the other end connected to the capacitor element 23b. The inner coil 21b has one end connected to the terminal T22 and the other end connected to the capacitor element 23a. A current for generating a magnetic field in the inner coils 21a and 21b and outer coil 22 is fed to the terminals T21 and T22.

The outer coil 22 has a circular shape with its radius denoted as "r22" which is larger than the radius "r21" of the inner coils 21a and 21b (r22>r21). The inner coils 21a and 21b are formed inside a loop of the outer coil 22.

The outer coil 22 is formed so as to surround the inner coils 21a and 21b. The outer coil 22 is formed such that a magnetic flux opposite in phase to a magnetic flux outside the inner coils 21a and 21b is generated outside the outer coil 22.

For example, the outer coil 22 is formed such that a current is flowed in a direction opposite to a current flowing in the inner coils 21a and 21b. More specifically, in a case where the current is flowing in the inner coils 21a and 21b in the clockwise direction, the outer coil 22 is formed such that the current is flowed in the counterclockwise direction.

The outer coil 22 is connected between the inner coils 21a and 21b via the capacitor elements 23a and 23b. A combined capacitance of the capacitor elements 23a and 23b is a value that resonates with a combined self-inductance of the inner coils 21a and 21b and outer coil 22 at the power transmitting frequency.

The power transfer coil 20 is formed so as to be symmetrical when viewed from one end of the inner coil 21a connected to the terminal T21 and one end of the inner coil 21b connected to the terminal T22.

Figure 9:
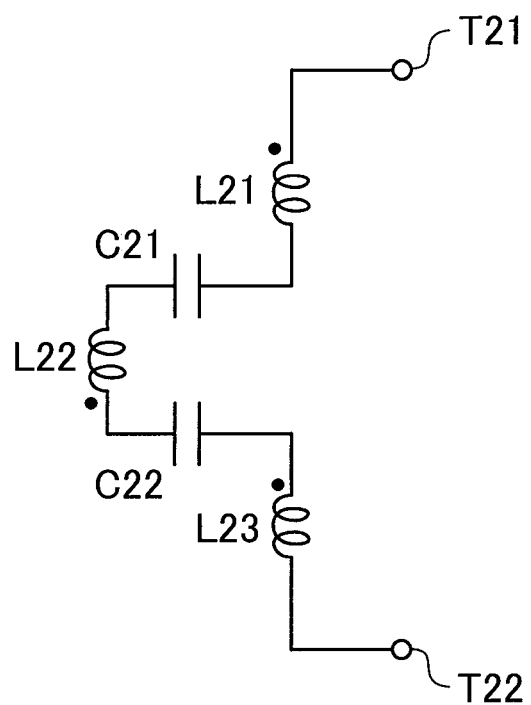
FIG. 9 is a drawing showing an equivalent circuit of the power transfer coil.

FIG. 9 is a drawing showing an equivalent circuit of the power transfer coil 20. FIG. 9 shows the terminals T21 and T22 of FIG. 8.

An inductor L21 of FIG. 9 corresponds to the inner coil 21a of FIG. 8. A capacitor element C21 of FIG. 9 corresponds to the capacitor element 23b of FIG. 8. An inductor L22 of FIG. 9 corresponds to the outer coil 22 of FIG. 8. A capacitor element C22 of FIG. 9 corresponds to the capacitor element 23a of FIG. 8. An inductor L23 of FIG. 9 corresponds to the inner coil 21b of FIG. 8.

As shown in FIG. 9, the equivalent circuit of the power transfer coil 20 is also formed so as to be symmetrical when viewed from one end of the inner coil 21a connected to the terminal T21 and one end of the inner coil 21b connected to the terminal T22.

The relation between the sizes of the inner coils 21a and 21b and outer coil 22 and the relation between the numbers of turns of the inner coils 21a and 21b and outer coil 22 are the same as those of the first embodiment. For example, the radius "r22" of the outer coil 22 shown in FIG. 8 is set to be $2^{1/2}$ times as large as the radius "r21" of the inner coils 21a and 21b. In addition, the coils are wound such that the current flowing in the inner coils 21a and 21b is twice as large as the current flowing in the outer coil 22. For example, the coils are wound such that the sum of the number of turns of the inner coil 21a and the number of turns of the inner coil 21b is twice as large as the number of turns of the outer coil 22. Thus, leakage magnetic field in the far field of the power transfer coil 20 is suppressed.

By providing the configuration of the power transfer coil 20 shown in FIG. 8, leakage power in the near field can also be suppressed. In particular, the power transfer coil 20 is formed so as to be symmetrical when viewed from one end of the inner coil 21a connected to the terminal T21 and one end of the inner coil 21b connected to the terminal T22, so that the effect of suppressing leakage magnetic field in the near field is enhanced. In addition, the equivalent circuit of the power transfer coil 20 is also formed so as to be symmetrical, so that the effect of suppressing leakage magnetic field in the near field is further enhanced.

Figure 10:
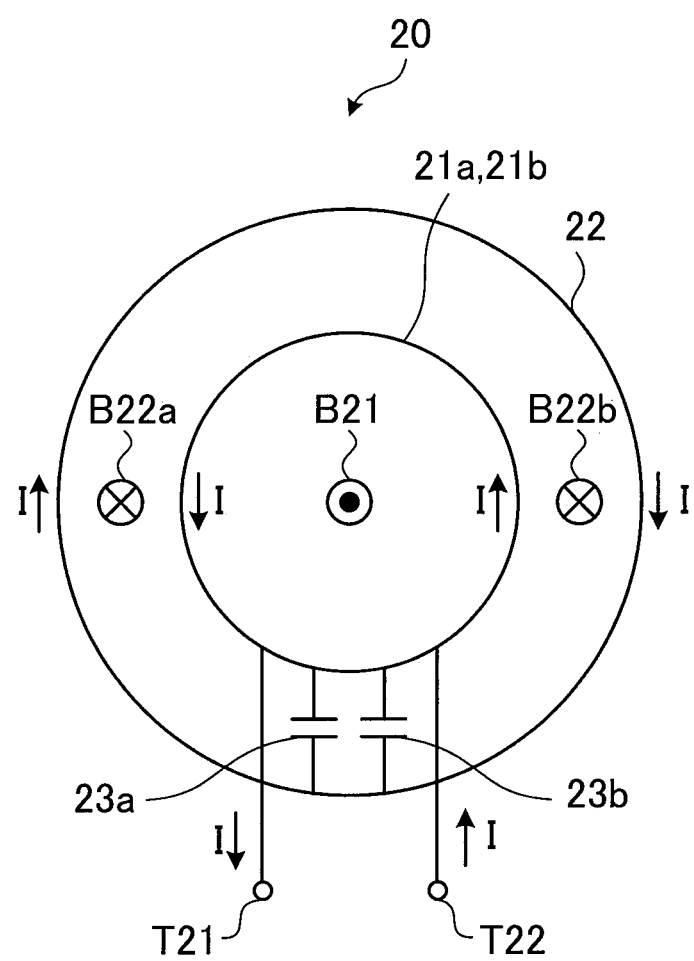
FIG. 10 is a drawing describing a magnetic field generated by the power transfer coil.

FIG. 10 is a drawing describing the magnetic field generated by the power transfer coil 20. FIG. 10 shows the power transfer coil 20 of FIG. 8 in a simplified manner. In FIG. 10, components that are the same as those shown in FIG. 8 are denoted by the same reference signs.

As shown in FIG. 10, in a case where current I is fed from the terminal T22, a magnetic flux generated by the inner coils 21a and 21b and a magnetic flux generated by the outer coil 22 cause a magnetic flux as in a magnetic flux B21 shown in FIG. 10 extending from the back side of the drawing plane toward the front side of the drawing plane to be generated inside the inner coils 21a and 21b.

Further, the magnetic flux generated by the inner coils 21a and 21b and the magnetic flux generated by the outer coil 22 cause a magnetic flux as in magnetic fluxes B22a and B22b shown in FIG. 10 extending from the front side of the drawing plane toward the back side of the drawing plane to be generated between the inner coils 21a and 21b and the outer coil 22.

The magnetic flux generated by the inner coils 21a and 21b and the magnetic flux generated by the outer coil 22 cause the magnetic flux outside the outer coil 22 to be "0". Namely, the power transfer coil 20 suppresses leakage magnetic field in its near field as well.

Power transmission efficiency based on the numbers of turns of the power transfer coil at the power supplying end and power transfer coil at the power receiving end is the same as that of the first embodiment, and descriptions thereof will be omitted as appropriate. In addition, power transmission efficiency based on the shapes of the power transfer coil at the power supplying end and power transfer coil at the power receiving end is also the same as that of the first embodiment, and descriptions thereof will be omitted as appropriate.

As described above, the power transfer coil 20 includes the outer coil 22 formed so as to surround the inner coils 21a and 21b such that a magnetic flux opposite in phase to the magnetic flux outside the inner coils 21a and 21b is generated outside the outer coil 22, the outer coil 22 having one end connected to the inner coil 21a and the other end connected to the inner coil 21b. Thus, the power transfer coil 20 can suppress leakage magnetic field in the far field and near field.

In addition, the inner coils 21a and 21b and the outer coil 22 of the power transfer coil 20 are each formed so as to be symmetrical when viewed from one end of the inner coil 21a and one end of the inner coil 21b. Further, the equivalent circuit of the power transfer coil 20 is also formed so as to be symmetrical when viewed from one end of the inner coil 21a and one end of the inner coil 21b. Thus, the power transfer coil 20 can suppress leakage magnetic field in the near field.

In addition, a current approximately twice as large as the current flowing in the outer coil 22 is flowed in the inner coils 21a and 21b of the power transfer coil 20. Further, the radius of the outer coil 22 is approximately $2^{1/2}$ times as large as the radius of the inner coils 21a and 21b. Thus, the power transfer coil 20 can suppress leakage magnetic field in the near field.

In addition, the power transfer coil 20 includes the capacitor element 23b connected between the inner coil 21a and the outer coil 22, and the capacitor element 23a connected between the inner coil 21b and the outer coil 22. Thus, the power transfer coil 20 can suppress a decrease in the self-resonant frequency.

In addition, the power transfer coil 20 has the inner coils 21a and 21b and outer coil 22 formed on the same planar surface, so that miniaturization can be achieved.

Third Embodiment

In the first embodiment, two outer coils 12a and 12b surrounding the inner coil 11 have the same shape and are arranged in the same position. In a third embodiment, two outer coils surrounding the inner coil are arranged at separate positions.

Figure 11:
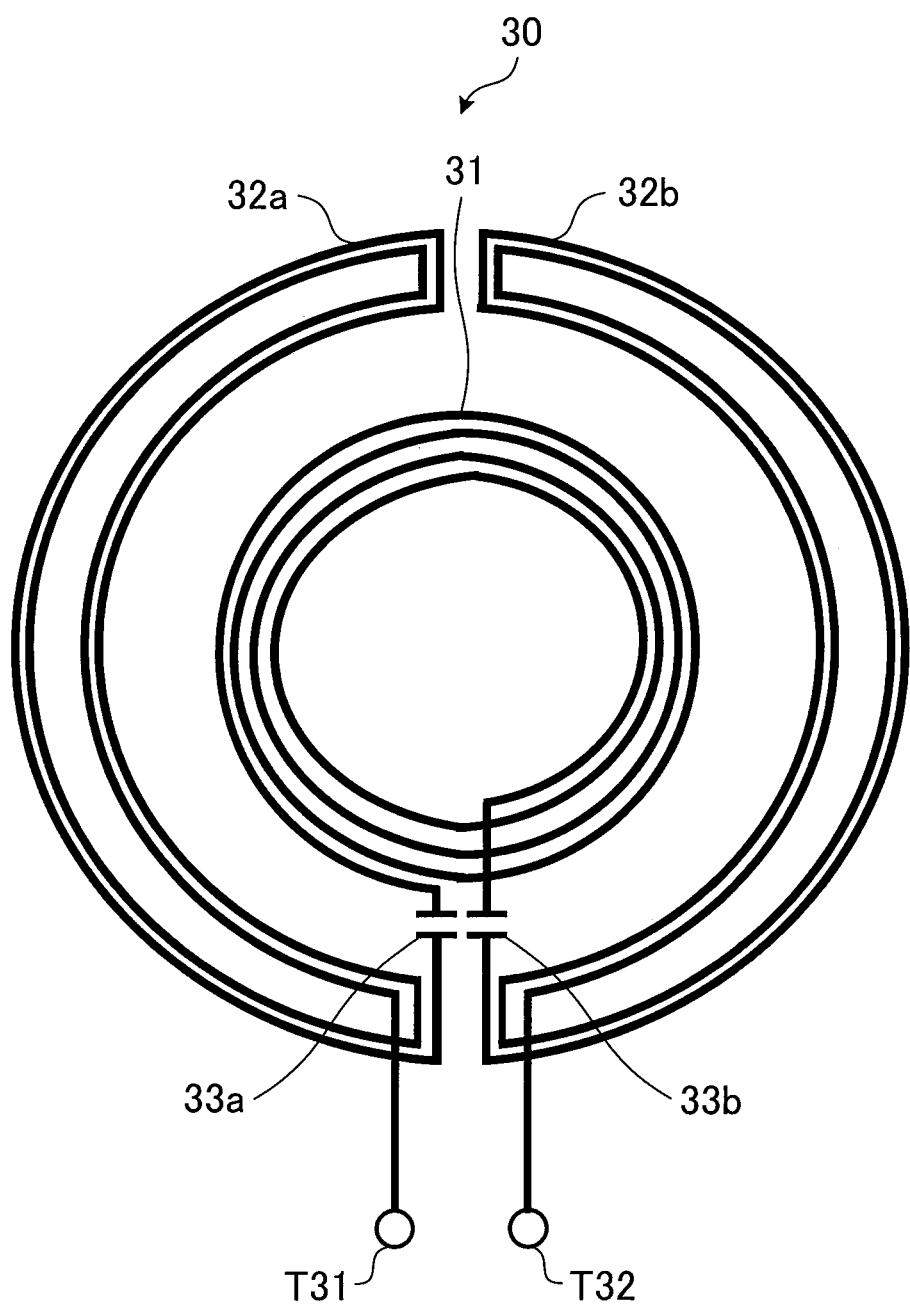
FIG. 11 is a drawing showing a configuration example of a power transfer coil according to a third embodiment.

FIG. 11 is a drawing showing a configuration example of a power transfer coil 30 according to the third embodiment. As shown in FIG. 11, the power transfer coil 30 includes terminals T31 and T32, an inner coil 31, outer coils 32a and 32b, and capacitor elements 33a and 33b. The inner coil 31 and the outer coils 32a and 32b are formed on the same planar surface. The power transfer coil 30 is applied to a power supplying device (such as the charger 2 of FIG. 1) configured to transmit power or a power receiving device (such as the mobile device 3 of FIG. 1) configured to receive the power.

The outer coils 32a and 32b have the same shape and are arranged at separate positions. The outer coils 32a and 32b each have a crescent shape extending along the circular shape of the inner coil 31 and collectively form a circular shape. The outer coil 32a surrounds half (including substantially half; the same applies to the term hereinafter) of the inner coil 31, and the outer coil 32b surrounds the remaining half of the inner coil 31.

The inner coil 31 is connected between the outer coils 32a and 32b via the capacitor elements 33a and 33b. A combined capacitance of the capacitor elements 33a and 33b is a value that resonates with a combined self-inductance of the inner coil 31 and outer coils 32a and 32b at the power transmitting frequency.

The inner coil 31 has a circular shape. The inner coil 31 is arranged so as to be surrounded by the outer coils 32a and 32b outside a loop of each of the outer coils 32a and 32b.

The outer coil 32a forms a loop outside the inner coil 31 and is formed such that a magnetic flux opposite in phase to a magnetic flux outside the inner coil 31 is generated outside this loop. For example, the outer coil 32a is formed such that a current is flowed in a direction opposite to a current flowing in the inner coil 31. More specifically, in a case where the current is flowing in the inner coil 31 in the counterclockwise direction, the outer coil 32a is formed such that the current is flowed in the clockwise direction.

The outer coil 32b forms a loop outside the inner coil 31 and is formed such that a magnetic flux opposite in phase to the magnetic flux outside the inner coil 31 is generated outside this loop. For example, the outer coil 32b is formed such that a current is flowed in a direction opposite to the current flowing in the inner coil 31. More specifically, in a case where the current is flowing in the inner coil 31 in the counterclockwise direction, the outer coil 32b is formed such that the current is flowed in the clockwise direction.

The outer coil 32a has one end connected to the terminal T31 and the other end connected to the capacitor element 33a. The outer coil 32b has one end connected to the terminal T32 and the other end connected to the capacitor element 33b. A current for generating a magnetic field in the inner coil 31 and outer coils 32a and 32b is fed to the terminals T31 and T32.

The power transfer coil 30 is formed so as to be symmetrical when viewed from one end of the outer coil 32a connected to the terminal T31 and one end of the outer coil 32b connected to the terminal T32.

Figure 12:
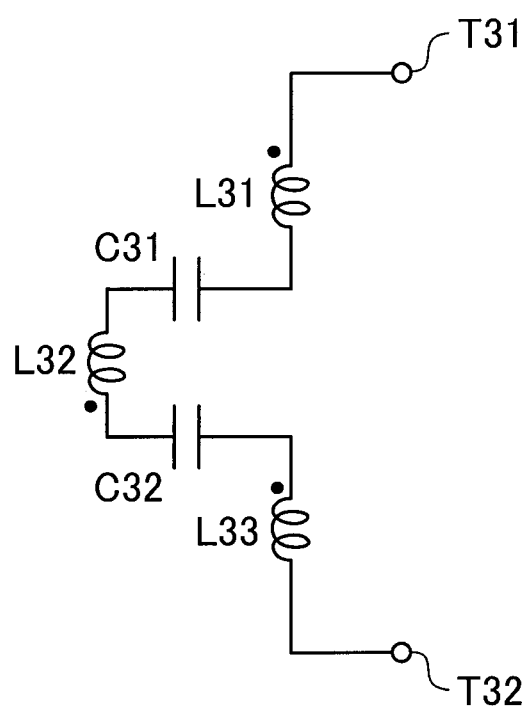
FIG. 12 is a drawing showing an equivalent circuit of the power transfer coil.

FIG. 12 is a drawing showing an equivalent circuit of the power transfer coil 30. FIG. 12 shows the terminals T31 and T32 of FIG. 11.

An inductor L31 of FIG. 12 corresponds to the outer coil 32a of FIG. 11. A capacitor element C31 of FIG. 12 corresponds to the capacitor element 33a of FIG. 11. An inductor L32 of FIG. 12 corresponds to the inner coil 31 of FIG. 11. A capacitor element C32 of FIG. 12 corresponds to the capacitor element 33b of FIG. 11. An inductor L33 of FIG. 12 corresponds to the outer coil 32b of FIG. 11.

As shown in FIG. 12, the equivalent circuit of the power transfer coil 30 is also formed so as to be symmetrical when viewed from one end of the outer coil 32a connected to the terminal T31 and one end of the outer coil 32b connected to the terminal T32.

The relation between the sizes of the inner coil 31 and outer coils 32a and 32b and the relation between the numbers of turns of the inner coil 31 and outer coils 32a and 32b are obtained from the equations (1) and (2). For example, an area of the inner coil 31 is set to be equal to the sum of the areas of the outer coils 32a and 32b. In addition, the inner coil 31 and the outer coils 32a and 32b are wound such that the current flowing in the coils are the same as each other. For example, the coils are wound such that the numbers of turns of the inner coil 31 and outer coils 32a and 32b are equal to one another. Thus, leakage magnetic field in the far field of the power transfer coil 30 is suppressed.

By providing the configuration of the power transfer coil 30 shown in FIG. 11, leakage power in the near field can also be suppressed. In particular, the power transfer coil 30 is formed so as to be symmetrical when viewed from one end of the outer coil 32a connected to the terminal T31 and one end of the outer coil 32b connected to the terminal T32, so that the effect of suppressing leakage magnetic field in the near field is enhanced. In addition, the equivalent circuit of the power transfer coil 30 is also formed so as to be symmetrical, so that the effect of suppressing leakage magnetic field in the near field is further enhanced.

In addition, at the time of wireless power transfer using the power transfer coil 30, power can be efficiently transmitted even if the positions of the power transfer coils 30 at the power supplying end and power receiving end are slightly misaligned from each other, as described below.

Figure 13:
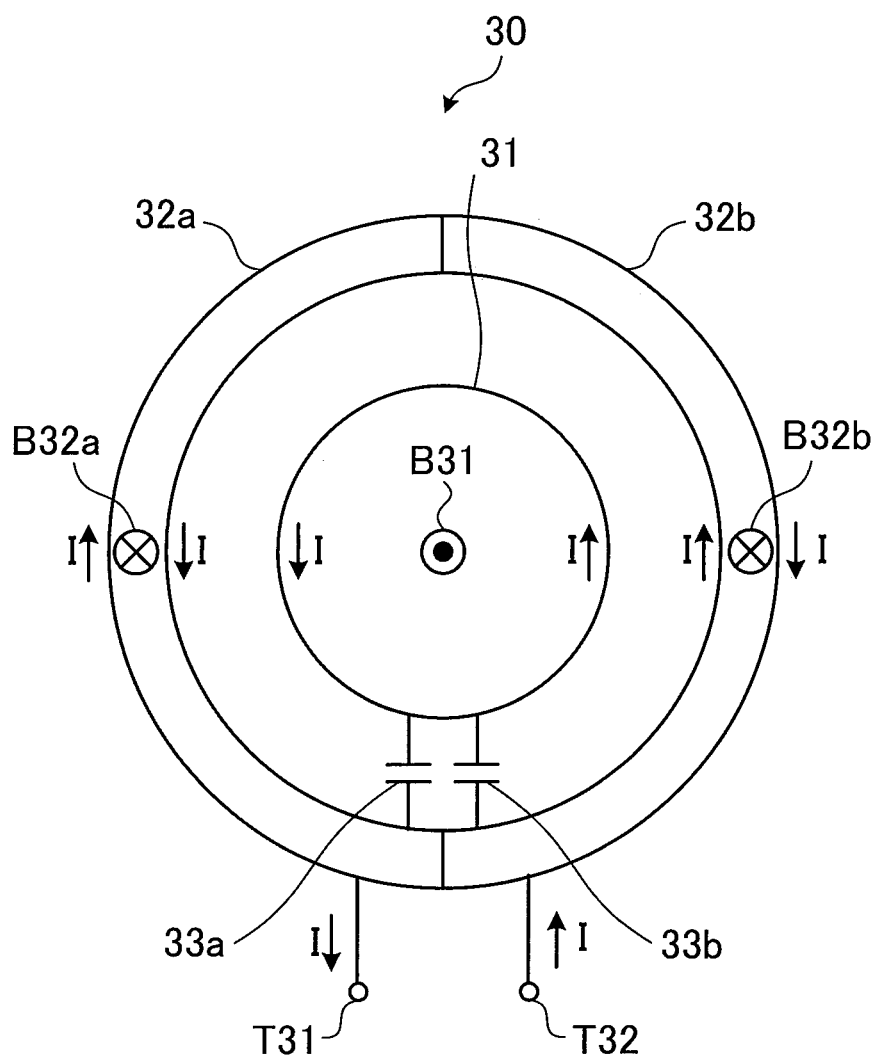
FIG. 13 is a drawing describing a magnetic field generated by the power transfer coil.

FIG. 13 is a drawing describing the magnetic field generated by the power transfer coil 30. FIG. 13 shows the power transfer coil 30 of FIG. 11 in a simplified manner. In FIG. 13, components that are the same as those shown in FIG. 11 are denoted by the same reference signs.

As shown in FIG. 13, in a case where current I is fed from the terminal T32, a magnetic flux generated by the inner coil 31 and a magnetic flux generated by the outer coils 32a and 32b cause a magnetic flux as in a magnetic flux B31 shown in FIG. 13 extending from the back side of the drawing plane toward the front side of the drawing plane to be generated inside the inner coil 31.

The magnetic flux generated by the inner coil 31 and the magnetic flux generated by the outer coils 32a and 32b cause the magnetic flux between the inner coil 31 and the outer coils 32a and 32b to be "0". Namely, a flux-free (including substantially flux-free; the same applies to the term hereinafter) region is formed between the inner coil 31 and the outer coils 32a and 32b.

Further, the magnetic flux generated by the inner coil 31 and the magnetic flux generated by the outer coils 32a and 32b cause a magnetic flux as in magnetic fluxes B32a and B32b shown in FIG. 13 extending from the front side of the drawing plane toward the back side of the drawing plane to be generated inside each of the outer coils 32a and 32b.

The magnetic flux generated by the inner coil 31 and the magnetic flux generated by the outer coils 32a and 32b cause the magnetic flux outside the outer coils 32a and 32b to be "0". Namely, the power transfer coil 30 suppresses leakage magnetic field in its near field as well.

Figure 14:
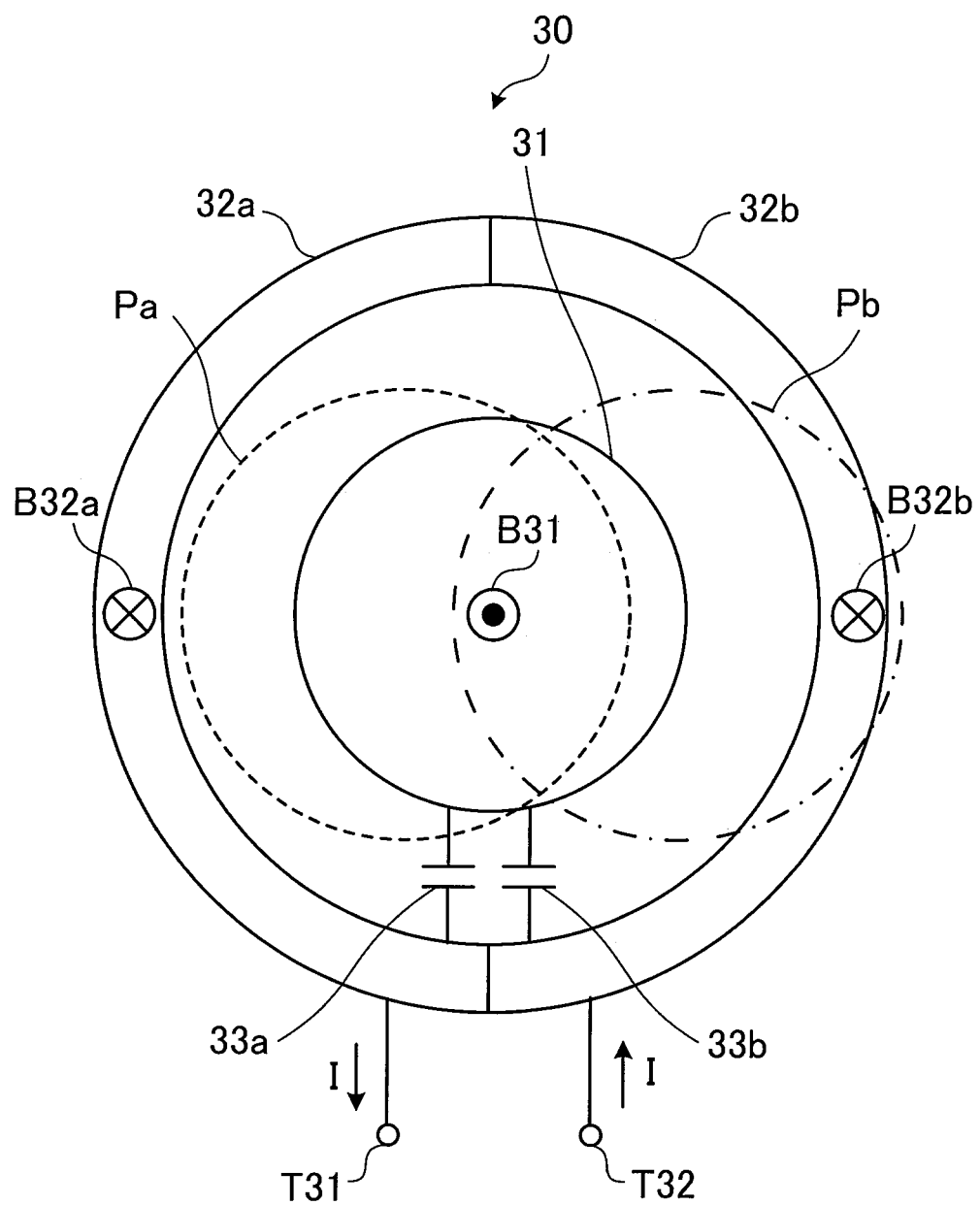
FIG. 14 is a drawing describing power transmission efficiency.

FIG. 14 is a drawing describing power transmission efficiency. FIG. 14 shows the power transfer coil 30 of FIG. 13. In addition, FIG. 14 shows the power transfer coil P (power transfer coils Pa and Pb of the same size) of FIG. 6 in a simplified manner.

In FIG. 14, the power transfer coil 30 configured to transmit power is a power transfer coil at the power supplying end, and the power transfer coils Pa and Pb configured to receive the power are power transfer coils at the power receiving end. Hereinafter, when there is no need to distinguish between the power transfer coils Pa and Pb, the coils will be collectively referred to as the power transfer coil P. The power transfer coil P is larger than the inner coil 31 but is smaller than the circular shape formed by two outer coils 32a and 32b.

As described with reference to FIG. 13, the flux-free region is formed between the inner coil 31 and the outer coils 32a and 32b. For this reason, as can be seen from the power transfer coil Pa denoted by a dotted line, even if a center of the power transfer coil Pa is slightly misaligned from a center of the power transfer coil 30, the magnetic flux B31 enters the power transfer coil Pa while the magnetic fluxes B32a and B32b opposite in phase to the magnetic flux B31 do not enter the power transfer coil Pa. Thus, in the power transfer coil 30, a decrease in power transmission efficiency can be suppressed even if the position is slightly misaligned from the power transfer coil Pa at the power receiving end. Accordingly, if a center of the power transfer coil Pb is largely misaligned from the center of the power transfer coil 30 as can be seen from the power transfer coil Pb denoted by a dot-and-dash line, the magnetic flux B31 and the magnetic fluxes B32a and B32b opposite in phase to the magnetic flux B31 would enter the power transfer coil Pb, causing a decrease in power transmission efficiency.

The above has described a case where the power transfer coil at the power receiving end is the circular power transfer coil P simply wound in one direction. However, the same can be applied in a case where the power transfer coil at the power receiving end is the power transfer coil 30. Namely, in a case where the power transfer coils at the power supplying end and power receiving end are each a power transfer coil 30, a decrease in power transmission efficiency can be suppressed even if the positions are slightly misaligned.

FIG. 15 is a graph showing a relation between a distance from a power transfer coil and a magnitude of leakage magnetic field. The horizontal axis of FIG. 15 represents the distance from the outer coil of the power transfer coil, and the vertical axis thereof represents the magnitude of leakage magnetic field. Measurements of leakage magnetic field were performed under conditions in which the power transfer coil at the power supplying end and the power transfer coil at the power receiving end were centered and were separated at a distance of 10 mm. Note that the magnitude of leakage magnetic field is relatively indicated by the value of the power received by a non-resonant pickup coil.

A waveform W1 indicates the magnitude of leakage magnetic field of the power transfer coil P shown in FIG. 6. The radius of the power transfer coil P is set to "2.5 cm", and the number of turns thereof is set to "5".

A waveform W2 indicates the magnitude of leakage magnetic field of the power transfer coil 10 shown in FIG. 2. The radius of the inner coil 11 is set to "2.5 cm", and the number of turns thereof is set to "10". In addition, the radius of the outer coils 12a and 12b is set to "3.5 cm", and the number of turns of each of the coils is set to "2.5".

A waveform W3 indicates the magnitude of leakage magnetic field of the power transfer coil 30 shown in FIG. 11. The radius of the inner coil 31 is set to "2.5 cm", and the number of turns thereof is set to "5". In addition, the radius at an outer periphery of the outer coils 32a and 32b is set to "4.5 cm", the radius at an inner periphery thereof is set to "3.7 cm", and the number of turns of each of the coils is set to "5".

As indicated by the waveforms W2 and W3, it can be understood that the power transfer coils 10 and 30 suppress leakage magnetic field as compared to the power transfer coil P of FIG. 6 not having a structure for cancelling magnetic flux. For example, it can be understood that the power transfer coil 10 can obtain an effect of suppressing leakage magnetic field of approximately 20 dB as compared to the power transfer coil P.

The power transfer coil 10 of FIG. 2 has the inner coil 11 connected between two outer coils 12a and 12b, whereas the power transfer coil 20 of FIG. 8 has the outer coil 22 connected between two inner coils 21a and 21b. Therefore, the power transfer coil 20 can obtain measurement results of leakage magnetic field similar to that of the waveform W2. For example, by setting the radius of the inner coils 21a and 21b of the power transfer coil 20 to "2.5 cm" and the number of turns of each of the coils to "5", and setting the radius of the outer coil 22 to "3.5 cm" and the number of turns thereof to "5", the magnitude of leakage magnetic field indicated by the waveform W2 can be obtained.

Figure 16:
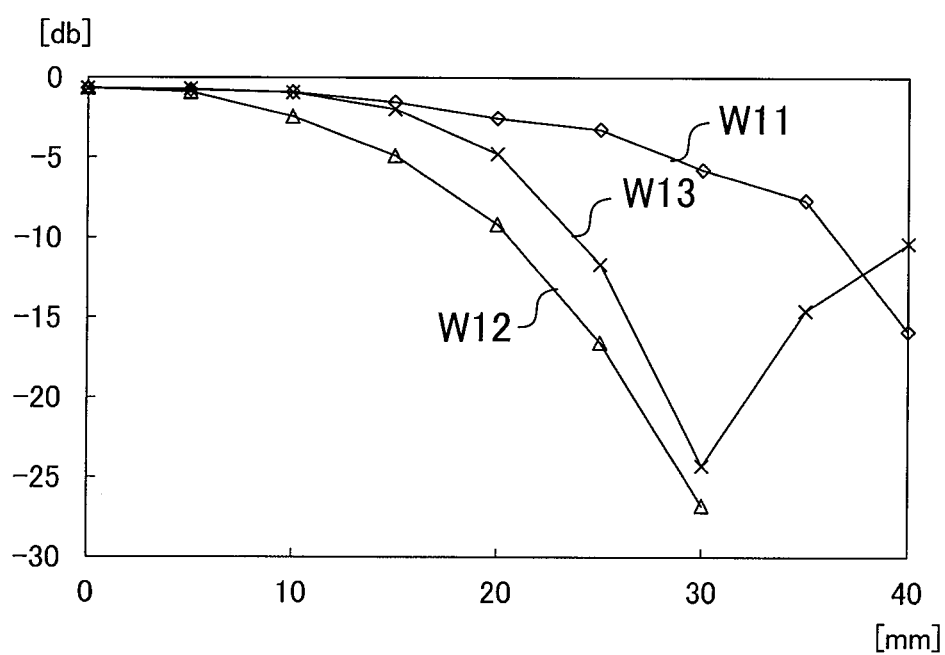
FIG. 16 is a graph showing a relation between misalignment of the power transfer coils and transmission properties.

FIG. 16 is a graph showing a relation between misalignment of the power transfer coils and transmission properties. The horizontal axis of FIG. 16 represents misalignment between the center of the power transfer coil at the power supplying end and the center of the power transfer coil at the power receiving end. The vertical axis of FIG. 16 represents power transmission properties (S21).

A waveform W11 indicates transmission properties of the power transfer coil P shown in FIG. 6. A waveform W12 indicates transmission properties of the power transfer coil 10 shown in FIG. 2. A waveform W13 indicates transmission properties of the power transfer coil 30 shown in FIG. 11. The size and number of turns of each of the power transfer coils P, 10 and 30 are the same as those described with reference to FIG. 15.

As indicated by the waveform W12, it is considered that the power transfer coil 10 of FIG. 2 allows misalignment of up to approximately "10 mm". As indicated by the waveform W13, it is considered that the power transfer coil 30 of FIG. 11 allows misalignment of up to "17 mm". Note that the power transfer coil 20 of FIG. 8 can obtain measurement results of power transmission properties similar to that of the waveform W12.

As described above, the power transfer coil 30 includes: the outer coil 32a forming a loop outside the inner coil 31 such that a magnetic flux opposite in phase to the magnetic flux outside the inner coil 31 is generated outside this loop, the outer coil 32a having one end connected to the terminal T31 and the other end connected to one end of the inner coil 31; and the outer coil 32b forming a loop outside the inner coil 31 such that a magnetic flux opposite in phase to the magnetic flux outside the inner coil 31 is generated outside this loop, the outer coil 32b having one end connected to the terminal T32 and the other end connected to the other end of the inner coil 31. Thus, the power transfer coil 30 can suppress leakage magnetic field in the far field and near field. In addition, a decrease in power transmission efficiency can be suppressed even if misalignment between the coils at the power supplying end and power receiving end occurs.

In addition, the inner coil 31 and the outer coils 32a and 32b of the power transfer coil 30 are each formed so as to be symmetrical when viewed from one end of the outer coil 32a and one end of the outer coil 32b. Further, the equivalent circuit of the power transfer coil 30 is also formed so as to be symmetrical when viewed from one end of the outer coil 32a and one end of the outer coil 32b. Thus, the power transfer coil 30 can suppress leakage magnetic field in the near field.

In addition, a substantially same current is flowed in each of the inner coil 31 and outer coils 32a and 32b of the power transfer coil 30. Further, an area of the inner coil 31 is substantially equal to the sum of the areas of the outer coils 32a and 32b. Thus, the power transfer coil 30 can suppress leakage magnetic field in the near field.

In addition, the power transfer coil 30 includes the capacitor element 33a connected between the inner coil 31 and the outer coil 32a, and the capacitor element 33b connected between the inner coil 31 and the outer coil 32b. Thus, the power transfer coil 30 can suppress a decrease in the self-resonant frequency.

In addition, the power transfer coil 30 has the inner coil 31 and outer coils 32a and 32b formed on the same planar surface, so that miniaturization can be achieved.

Fourth Embodiment

In the third embodiment, two outer coils 32a and 32b surrounding the inner coil 31 are arranged at separate positions. In a fourth embodiment, two inner coils are also arranged at separate positions.

Figure 17:
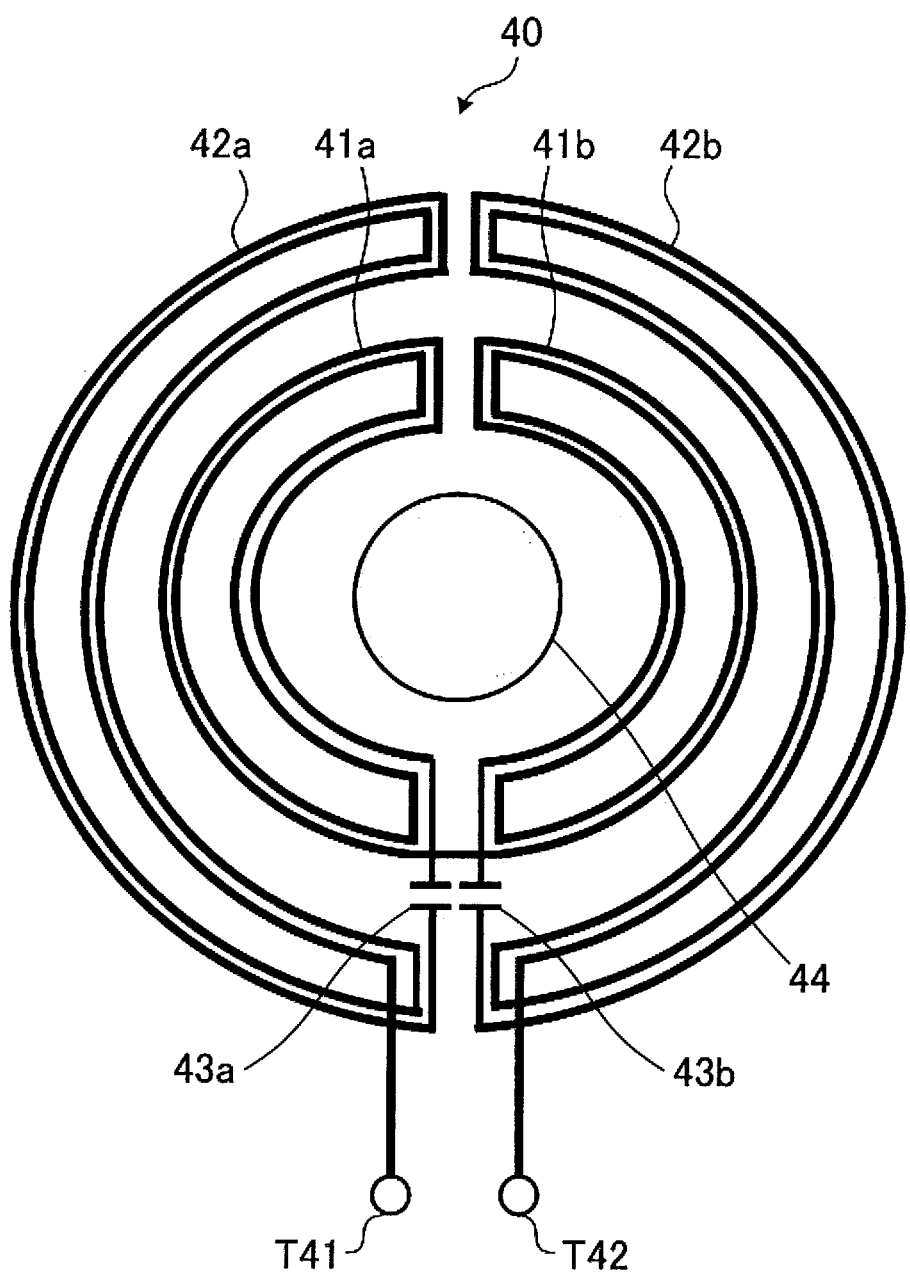
FIG. 17 is a drawing showing a configuration example of a power transfer coil according to a fourth embodiment.

FIG. 17 is a drawing showing a configuration example of a power transfer coil 40 according to the fourth embodiment. As shown in FIG. 17, the power transfer coil 40 includes terminals T41 and T42, inner coils 41a and 41b, outer coils 42a and 42b, capacitor elements 43a and 43b, and a shaft 44. The inner coils 41a and 41b and the outer coils 42a and 42b are formed on the same planar surface. The power transfer coil 40 is applied to a power supplying device (such as the charger 2 of FIG. 1) configured to transmit power or a power receiving device (such as the mobile device 3 of FIG. 1) configured to receive the power.

FIG. 17 shows a cross section of the shaft 44 extending in a perpendicular direction of the drawing plane. The shaft 44 rotates in the clockwise or counterclockwise direction of FIG. 17.

The inner coils 41a and 41b have the same shape and are arranged at separate positions. The inner coils 41a and 41b each have a crescent shape extending along a circular shape of the shaft 44 and collectively form a circular shape. The inner coil 41a surrounds half of the shaft 44 such that the shaft 44 is not inside the loop (is outside the loop) of the inner coil 41a. The inner coil 41b surrounds the remaining half of the shaft 44 such that the shaft 44 is not inside the loop of the inner coil 41b.

The outer coils 42a and 42b have the same shape and are arranged at separate positions. The outer coils 42a and 42b each have a crescent shape extending along a circular shape of the inner coils 41a and 41b and collectively form a circular shape. The outer coil 42a surrounds the inner coil 41a, and the outer coil 42b surrounds the inner coil 41b.

The outer coil 42a forms a loop outside the inner coil 41a and is formed such that a magnetic flux opposite in phase to a magnetic flux outside the inner coil 41a is generated outside this loop. For example, the outer coil 42a is formed such that a current is flowed in a direction opposite to a current flowing in the inner coil 41a. More specifically, in a case where the current is flowing in the inner coil 41a in the counterclockwise direction, the outer coil 42a is formed such that the current is flowed in the clockwise direction.

The outer coil 42b forms a loop outside the inner coil 41b and is formed such that a magnetic flux opposite in phase to a magnetic flux outside the inner coil 41b is generated outside this loop. For example, the outer coil 42b is formed such that a current is flowed in a direction opposite to a current flowing in the inner coil 41b. More specifically, in a case where the current is flowing in the inner coil 41b in the counterclockwise direction, the outer coil 42b is formed such that the current is flowed in the clockwise direction.

One end of the inner coil 41a is connected to one end of the inner coil 41b. The other end of the inner coil 41a is connected to the other end of the outer coil 42a via the capacitor element 43a. One end of the outer coil 42a is connected to the terminal T41. The other end of the inner coil 41b is connected to the outer coil 42b via the capacitor element 43b. One end of the outer coil 42b is connected to the terminal T42. In other words, two inner coils 41a and 41b are respectively connected between two outer coils 42a and 42b via the capacitor elements 43a and 43b. A combined capacitance of the capacitor elements 43a and 43b is a value that resonates with a combined self-inductance of the inner coils 41a and 41b and outer coils 42a and 42b at the power transmitting frequency. A current for generating a magnetic field in the inner coils 41a and 41b and outer coils 42a and 42b is fed to the terminals T41 and T42.

The power transfer coil 40 is formed so as to be symmetrical when viewed from one end of the outer coil 42a connected to the terminal T41 and one end of the outer coil 42b connected to the terminal 142.

Figure 18:
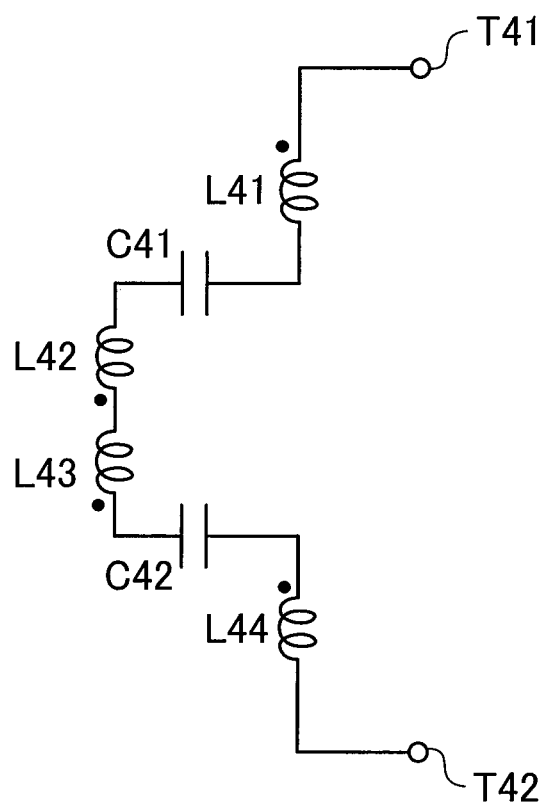
FIG. 18 is a drawing showing an equivalent circuit of the power transfer coil.

FIG. 18 is a drawing showing an equivalent circuit of the power transfer coil 40. FIG. 18 shows the terminals T41 and T42 of FIG. 17.

An inductor L41 of FIG. 18 corresponds to the outer coil 42a of FIG. 17. A capacitor element C41 of FIG. 18 corresponds to the capacitor element 43a of FIG. 17. An inductor L42 of FIG. 18 corresponds to the inner coil 41a of FIG. 17. An inductor L43 of FIG. 18 corresponds to the inner coil 41b of FIG. 17. A capacitor element C42 of FIG. 18 corresponds to the capacitor element 43b of FIG. 17. An inductor L43 of FIG. 18 corresponds to the outer coil 42b of FIG. 17.

As shown in FIG. 18, the equivalent circuit of the power transfer coil 40 is also formed so as to be symmetrical when viewed from one end of the outer coil 42a connected to the terminal T41 and one end of the outer coil 42b connected to the terminal 142.

The relation between the sizes of the inner coils 41a and 41b and outer coils 42a and 42b and the relation between the numbers of turns of the inner coils 41a and 41b and outer coils 42a and 42b are obtained from the equations (1) and (2). For example, the sum of the areas of the inner coils 41a and 41b is set to be equal to the sum of the areas of the outer coils 42a and 42b. In addition, the inner coils 41a and 41b and the outer coils 42a and 42b are wound such that the same current is flowed therein. For example, the coils are wound such that the numbers of turns of the inner coils 41a and 41b and outer coils 42a and 42b are equal to one another. Thus, leakage magnetic field in the far field of the power transfer coil 40 is suppressed.

By providing the configuration of the power transfer coil 40 shown in FIG. 17, leakage power in the near field can also be suppressed. In particular, the power transfer coil 40 is formed so as to be symmetrical when viewed from one end of the outer coil 42a connected to the terminal T41 and one end of the outer coil 42b connected to the terminal T42, so that the effect of suppressing leakage magnetic field in the near field is enhanced. In addition, the equivalent circuit of the power transfer coil 40 is also formed so as to be symmetrical, so that the effect of suppressing leakage magnetic field in the near field is further enhanced.

Figure 19:
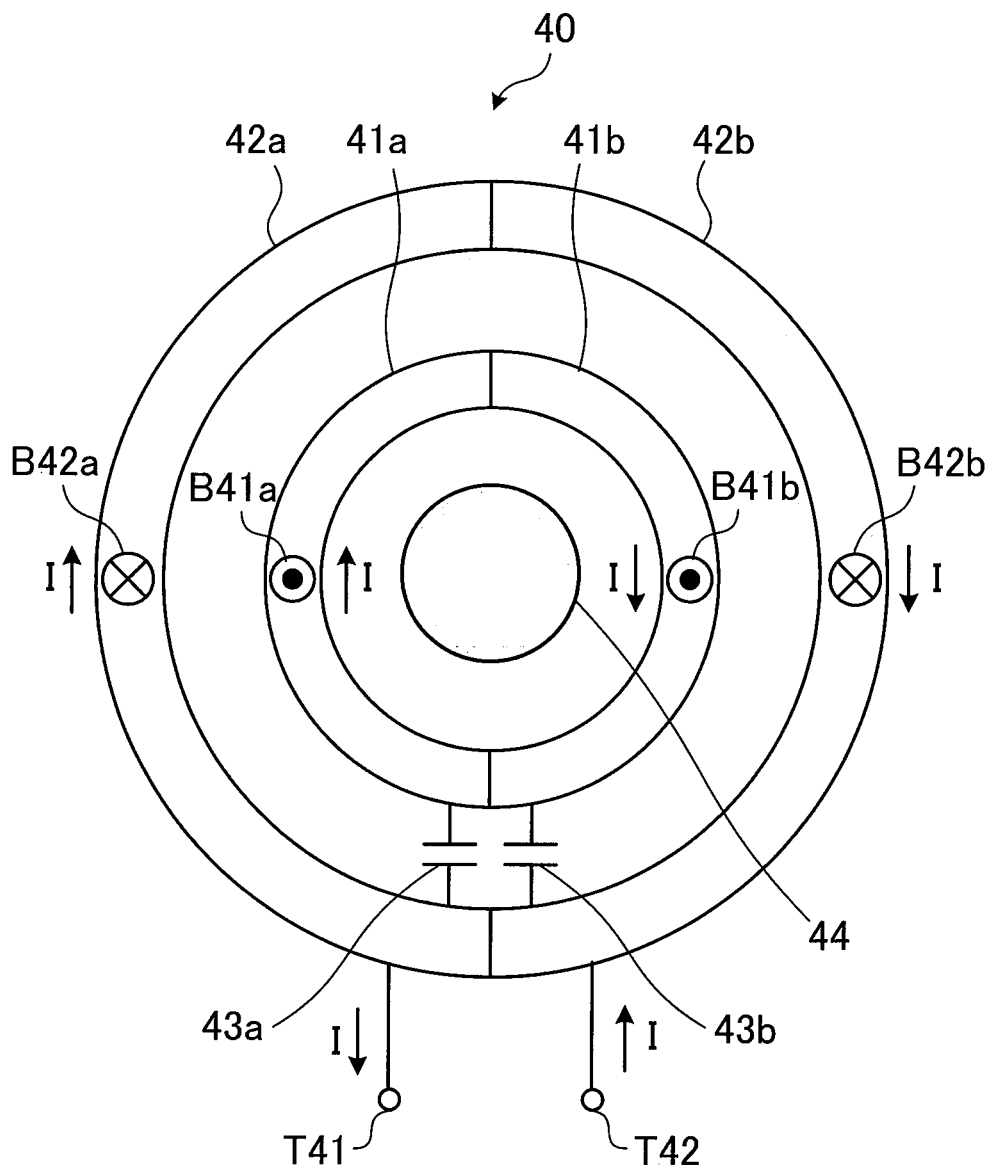
FIG. 19 is a drawing describing a magnetic field generated by the power transfer coil.

FIG. 19 is a drawing describing the magnetic field generated by the power transfer coil 40. FIG. 19 shows the power transfer coil 40 of FIG. 17 in a simplified manner. In FIG. 19, components that are the same as those shown in FIG. 17 are denoted by the same reference signs.

As shown in FIG. 19, in a case where current I is fed from the terminal T42, a magnetic flux generated by the inner coils 41a and 41b and a magnetic flux generated by the outer coils 42a and 42b cause a magnetic flux in a region that is outside the loops of the inner coils 41a and 41b and is surrounded by the inner coils 41a and 41b (region where the shaft 44 is present) to be "0". Namely, a flux-free region is formed in the region where the shaft 44 is present. Thus, in a case where the shaft 44 is made of metal, an eddy current can be suppressed from flowing in a surface of the shaft 44.

The magnetic flux generated by the inner coils 41a and 41b and the magnetic flux generated by the outer coils 42a and 42b cause a magnetic flux as in magnetic fluxes B41a and B41b shown in FIG. 19 extending from the back side of the drawing plane toward the front side of the drawing plane to be respectively generated inside the inner coils 41a and 41b.

The magnetic flux generated by the inner coils 41a and 41b and the magnetic flux generated by the outer coils 42a and 42b cause the magnetic flux between the inner coils 41a and 41b and the outer coils 42a and 42b to be "0". Namely, a flux-free region is formed between the inner coils 41a and 41b and the outer coils 42a and 42b.

Further, the magnetic flux generated by the inner coils 41a and 41b and the magnetic flux generated by the outer coils 42a and 42b cause a magnetic flux as in magnetic fluxes B42a and B42b shown in FIG. 19 extending from the front side of the drawing plane toward the back side of the drawing plane to be respectively generated inside the outer coils 42a and 42b.

The magnetic flux generated by the inner coils 41a and 41b and the magnetic flux generated by the outer coils 42a and 42b cause the magnetic flux outside the outer coils 42a and 42b to be "0". Namely, the power transfer coil 40 suppresses leakage magnetic field in its near field as well.

As described above, the power transfer coil 40 includes: the outer coil 42a forming a loop outside the inner coil 41a so as to surround the inner coil 41a such that a magnetic flux opposite in phase to the magnetic flux outside the inner coil 41a is generated outside this loop, the outer coil 42a having one end connected to the terminal T41 and the other end connected to the other end of the inner coil 41a; and the outer coil 42b forming a loop outside the inner coil 41b so as to surround the inner coil 41b such that a magnetic flux opposite in phase to the magnetic flux outside the inner coil 41b is generated outside this loop, the outer coil 42b having one end connected to the terminal T42 and the other end connected to the other end of the inner coil 41b. Thus, the power transfer coil 40 can suppress leakage magnetic field in the near field. In addition, a decrease in power transmission efficiency can be suppressed even if misalignment between the coils at the power supplying end and the power receiving end occurs. Further, a decrease in power transmission efficiency caused by an eddy current flowed in a surface of the metal can be suppressed even if metal is present inside the inner coils 41a and 41b.

In addition, the inner coils 41a and 41b and the outer coils 42a and 42b of the power transfer coil 40 are each formed so as to be symmetrical when viewed from one end of the outer coil 42a and one end of the outer coil 42b. Further, the equivalent circuit of the power transfer coil 40 is also formed so as to be symmetrical when viewed from one end of the outer coil 42a and one end of the outer coil 42b. Thus, the power transfer coil 40 can suppress leakage magnetic field in the near field.

In addition, a substantially same current is flowed in each of the inner coils 41a and 41b and outer coils 42a and 42b of the power transfer coil 40. Further, the sum of the areas of the inner coil 41a and 41b is substantially equal to the sum of the areas of the outer coils 42a and 42b. Thus, the power transfer coil 40 can suppress leakage magnetic field in the near field.

In addition, the power transfer coil 40 includes the capacitor element 43a connected between the inner coil 41a and the outer coil 42a, and the capacitor element 43b connected between the inner coil 41b and the outer coil 42b. Thus, the power transfer coil 40 can suppress a decrease in the self-resonant frequency.

In addition, the power transfer coil 40 has the inner coils 41a and 41b and outer coils 42a and 42b formed on the same planar surface, so that miniaturization can be achieved.

The above-described power transfer coils 10 to 40 of the embodiments each have a circular shape but are not limited to this shape. For example, the power transfer coils 10 to 40 may each have a quadrangular shape.

Fifth Embodiment

In a fifth embodiment, a power supplying device and a power receiving device utilizing the power transfer coil of the first to fourth embodiments will be described.

Figure 20:
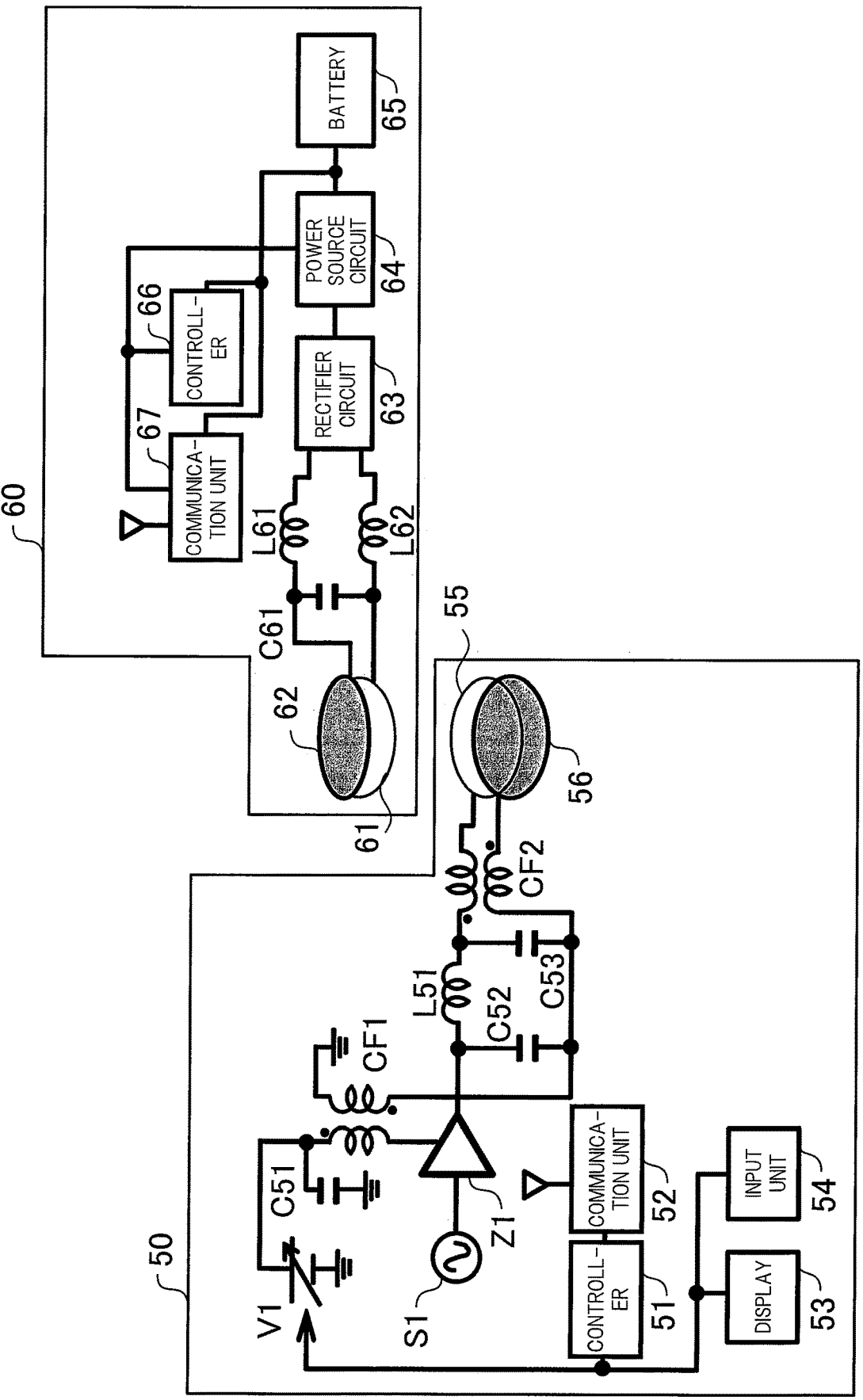
FIG. 20 is a drawing showing a block configuration example of a power supplying device and power receiving device according to a fifth embodiment.

FIG. 20 is a drawing showing a block configuration example of a power supplying device 50 and power receiving device 60 according to the fifth embodiment. As shown in FIG. 20, the power supplying device 50 includes a controller 51, a communication unit 52, a display 53, an input unit 54, a power transfer coil 55, a magnetic body 56, a power source V1, capacitor elements C51, C52 and C53, common-mode filters CF1 and CF2, an oscillator S1, an amplifier Z1, and an inductor L51. The power receiving device 60 includes a power transfer coil 61, a magnetic body 62, a rectifier circuit 63, a power source circuit 64, a battery 65, a controller 66, a communication unit 67, a capacitor element C61, and inductors L61 and L62. The charger 2 shown in FIG. 1 includes the power supplying device 50 shown in FIG. 20, and the mobile device 3 includes the power receiving device 60.

The controller 51 controls the entire the power supplying device 50. The communication unit 52 performs wireless communication with the power receiving device 60. The controller 51 detects whether the power receiving device 60 is placed on a power supplying base (charging base) via the communication unit 52. In addition, the controller 51 performs authentication of whether the power receiving device 60 placed on the power supplying base is a charging target device. Further, the controller 51 controls the transmitting amount of the power.

The display 53 displays predetermined information in response to the controls of the controller 51. The input unit 54 receives the user's operation and sends the received operation information to the controller 51.

The power source V1 is grounded at a high frequency via the capacitor element C51. The power source V1 supplies power to the amplifier Z1 via the common-mode filter CF1. The common-mode filter CF1 is connected between the power source V1 and the amplifier Z1 and suppresses conductive noise (common-mode noise) entering from a power source line.

An oscillation signal sent from the oscillator S1 is fed to the amplifier Z1. The amplifier Z1 performs a switching operation in response to the oscillation signal and sends a power transmitting signal (the transmitting power). In addition, the amplifier Z1 changes the magnitude (amplification factor) of the transmitting power in response to the control of the controller 51. The transmitting power is sent to the power transfer coil 55 via a low-pass filter and the common-mode filter CF2, the low-pass filter being formed by the inductor L51 and the capacitor elements C52 and C53.

The low-pass filter is connected between the amplifier Z1 and the power transfer coil 55 and removes harmonic noise in the transmitting power. The common-mode filter CF2 is connected between the amplifier Z1 and the power transfer coil 55 and suppresses conduction noise in the transmitting power, so that conduction noise is suppressed from being unnecessarily radiated from the power transfer coil 55.

The power transfer coil 55 is the power transfer coil 10 of FIG. 2, the power transfer coil 20 of FIG. 8, the power transfer coil 30 of FIG. 11 or the power transfer coil 40 of FIG. 17. The power transfer coil 55 wirelessly transfers the transmitting power sent from the amplifier Z1 to the power receiving device 60 by using inductive coupling. The magnetic body 56 suppresses a decrease in power transmission efficiency caused by a metal casing or the like of the power supplying device 50. In addition, the magnetic body 56 suppresses heat generation of the metal casing or the like of the power supplying device 50.

The power transfer coil 61 of the power receiving device 60 is the power transfer coil 10 of FIG. 2, the power transfer coil 20 of FIG. 8, the power transfer coil 30 of FIG. 11 or the power transfer coil 40 of FIG. 17. The power transfer coil 61 receives the power transmitted from the power supplying device 50 by using inductive coupling. The magnetic body 62 is identical to the magnetic body 56, suppresses a decrease in power transmission efficiency and heat generation and the like of the metal casing or the like of the power supplying device 50.

It is preferable that a power transfer coil of the same type as the power transfer coil 55 of the power supplying device 50 is utilized for the power transfer coil 61. In addition, the power transfer coil P of FIG. 6 may be utilized for the power transfer coil 61. In a case where the power transfer coil P is utilized for the power transfer coil 61, a resonant capacitor element is connected in series between the power transfer coil 61 and the low-pass filter. Further, the power transfer coil 61 and the capacitor element are series-resonated at the power transmitting frequency.

The capacitor element C61 and the inductors L61 and L62 form the low-pass filter. The low-pass filter suppresses harmonic noise in the power received by the power transfer coil 61. In addition, the low-pass filter suppresses harmonic noise sent from the rectifier circuit 63, so that harmonic noise sent from the rectifier circuit 63 is suppressed from being re-radiated from the power transfer coil 61.

The rectifier circuit 63 rectifies the power received by the power transfer coil 61 (or converts an alternating current to a direct current). The power source circuit 64 sends the rectified power to the battery 65, the controller 66 and the communication unit 67.

The battery 65 charges the power sent from the rectifier circuit 63. The controller 66 controls the entire power receiving device 60. The controller 66 controls the power source circuit 64 such that the power (voltage) sent from the power source circuit 64 is a suitable voltage. In addition, the controller 66 sends a charging state, such as the amount of the power currently being received and whether charging is completed, to the power supplying device 50 via the communication unit 67. The communication unit 67 performs wireless communication with the power supplying device 50.

Figure 21:
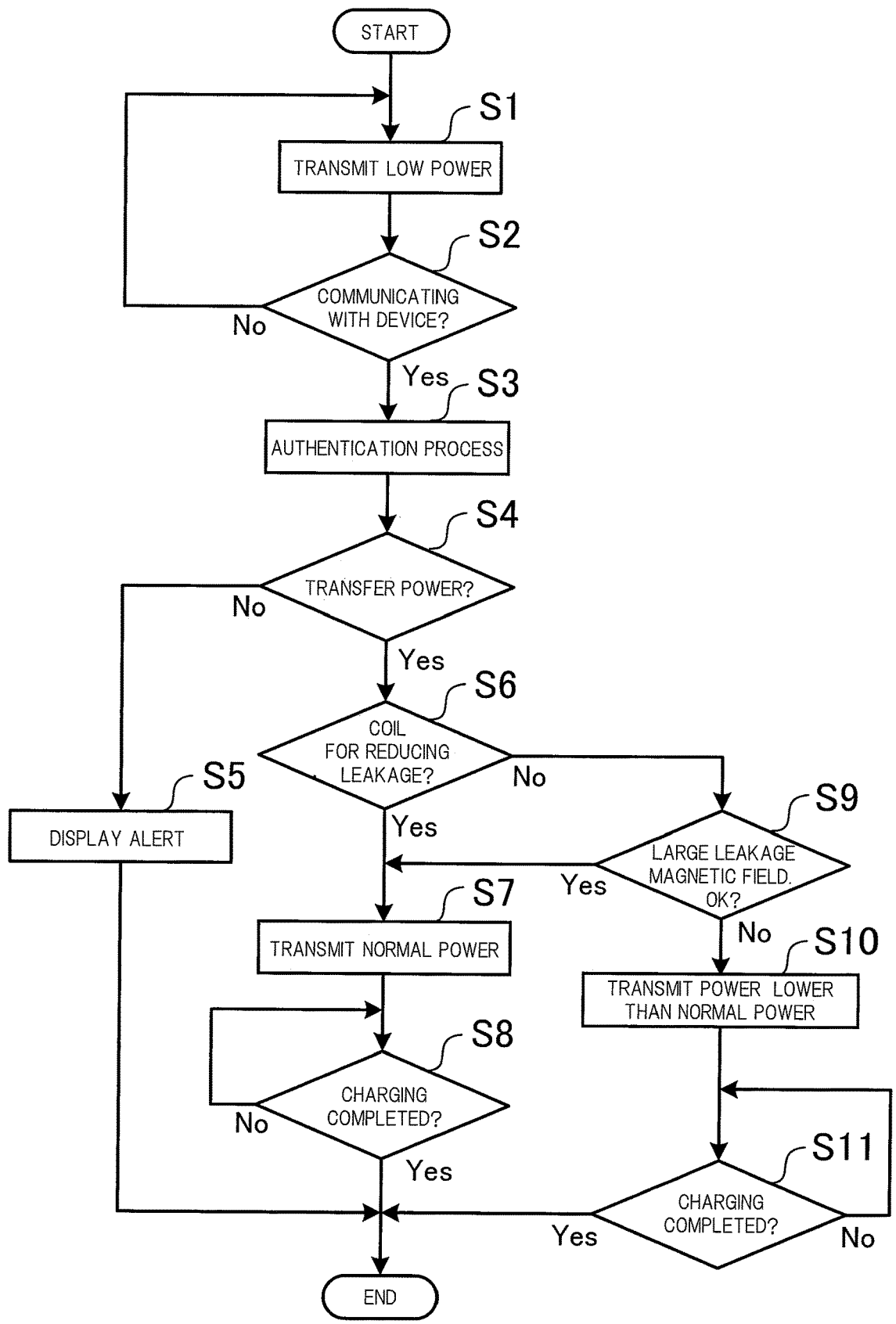
FIG. 21 is a flowchart showing an operation example of a controller of the power supplying device.

FIG. 21 is a flowchart showing an operation example of the controller 51 of the power supplying device 50. The controller 51 starts the process of the flowchart of FIG. 21 when, for example, the power is turned ON.

First, the controller 51 controls the amplifier Z1 such that a low power is transmitted from the power transfer coil 55 (step S1). Namely, the controller 51 transmits power in which the power receiving device 60 can operate at the minimum.

Next, the controller 51 determines whether wireless communication with the power receiving device 60 is possible via the communication unit 52 (step S2). Namely, the controller 51 determines whether the power receiving device 60 is placed on the power supplying base via wireless communication with the power receiving device 60.

In step S2, if the controller 51 determines that communication was not possible ("No" of S2), the controller 51 returns to the process of step S1.

In step S2, if the controller 51 determines that communication is possible ("Yes" of S2), the controller 51 performs an authentication process as to whether the power receiving device 60 placed on the power supplying base is an appropriated device (step S3). Here, the controller 51 authenticates the power receiving device 60 as an appropriate device and proceeds to the process of step S4.

The controller 51 then determines whether to transfer power to the power receiving device 60 placed on the power supplying base (step S4). For example, the controller 51 receives information on whether the power receiving device 60 is fully charged from the power receiving device 60 via the communication unit 52 and determines whether to transfer power.

In step S4, if the controller 51 determines to not transfer power ("No" of S4), the controller 51 displays an alert on the display 53 (step S5). For example, the controller 51 displays that the power receiving device 60 placed on the power supplying base is fully charged on the display. Then, the controller 51 finishes transferring power to the power receiving device 60 to end the process of the flowchart.

In step S4, if the controller 51 determines to transfer power ("Yes" of S4), the controller 51 determines whether the power receiving device 60 placed on the power supplying base is provided with a power transfer coil configured to reduce leakage magnetic field (step S6). For example, the controller 51 receives information of the power transfer coil provided in the power receiving device 60 from the power receiving device 60 via the communication unit 52 and determines that the device is provided with a power transfer coil configured to reduce leakage magnetic field based on this information. Alternatively, if the controller 51 does not receive information of the power transfer coil provided in the power receiving device 60 from the power receiving device 60 via the communication unit 52, the controller 51 determines that the power receiving device 60 is not provided with a power transfer coil configured to reduce leakage magnetic field.

The power transfer coil configured to reduce leakage magnetic field is the power transfer coil 10 of FIG. 2, the power transfer coil 20 of FIG. 8, the power transfer coil 30 of FIG. 11 or the power transfer coil 40 of FIG. 17. The power transfer coil not configured to reduce leakage magnetic field is, for example, the power transfer coil P of FIG. 6. Alternatively, the power transfer coil not configured to reduce leakage magnetic field is a power transfer coil of different shape than the power transfer coil 55. Specifically, this applies to a case where the power transfer coil 55 is the power transfer coil 10 and the power transfer coil 61 is the power transfer coil 20.

In step S6, if the controller 51 determines that the power receiving device 60 placed on the power supplying base is provided with a power transfer coil configured to reduce leakage magnetic field ("Yes" of S6), the controller 51 transmits power of normal size (step S7).

Then, the controller 51 determines whether charging of the power receiving device 60 is completed (step S8). For example, the controller 51 receives charging information from the power receiving device 60 via the communication unit 52 and determines whether charging of the power receiving device 60 is completed.

In step S8, if the controller 51 determines that charging of the power receiving device 60 is not completed ("No" of S8), the controller 51 repeats the process of step S8. On the other hand, in step S8, if the controller 51 determines that charging of the power receiving device 60 is completed ("Yes" of S8), the controller 51 ends the process of the flowchart.

In step S6, if the controller 51 determines that the power receiving device 60 placed on the power supplying base is not provided with a power transfer coil configured to reduce leakage magnetic field ("No" of S6), the controller 51 receives information from the user via the input unit 54 on whether to transmit normal power even if leakage magnetic field is large (step S9). When receiving information from the user on whether to transmit normal power, the controller 51 displays a screen on the display 53 confirming whether to transmit normal power even if leakage magnetic field is large.

If the controller 51 receives information from the user via the input unit 54 that normal power is to be transmitted ("Yes" of S9), the controller 51 proceeds to the process of step S7.

If the controller 51 receives information from the user via the input unit 54 that normal power is not to be transmitted ("No" of S9), a power lower than the normal power is transmitted to the power receiving device 60 (step S10). Namely, the controller 51 reduces the transmitting power, so that leakage magnetic field is small. In other words, the power supplying device 50 reduces adverse effects on peripheral electronic devices and the like caused by leakage magnetic field.

Then, the controller 51 determines whether charging of the power receiving device 60 is completed (step S11). In step S11, if the controller 51 determines that charging of the power receiving device 60 is not completed ("No" of S11), the controller 51 repeats the process of step S11. On the other hand, in step S11, if the controller 51 determines that charging of the power receiving device 60 is completed ("Yes" of S11), the controller 51 ends the process of the flowchart.

Note that the process of step S9 may be omitted.

As described above, the power supplying device 50 includes the amplifier Z1, the common-mode filter CF1 connected between the power source V1 and the amplifier Z1, and the common-mode filter CF2 connected between the amplifier Z1 and the power transfer coil 55. Thus, the power supplying device 50 can suppress leakage magnetic field. In addition, the power supplying device 50 can suppress conduction noise in the transmitting power, so that conduction noise is suppressed from being unnecessarily radiated from the power transfer coil 55.

The power receiving device 60 includes the rectifier circuit 63 configured to rectify the power received by the power transfer coil 61, and the low-pass filter connected between the power transfer coil 61 and the rectifier circuit 63. Thus, the power receiving device 60 can suppress leakage magnetic field. In addition, the power receiving device 60 suppresses harmonics of the received power generated in the rectifier circuit 63 from being re-radiated from the power transfer coil 61.

Examples of the charger 2 and mobile device 3 have been described above as application examples of the power supplying device 50 and power receiving device 60. Hereinafter, other application examples of the power supplying device 50 and power receiving device 60 will be described.

Figure 22:
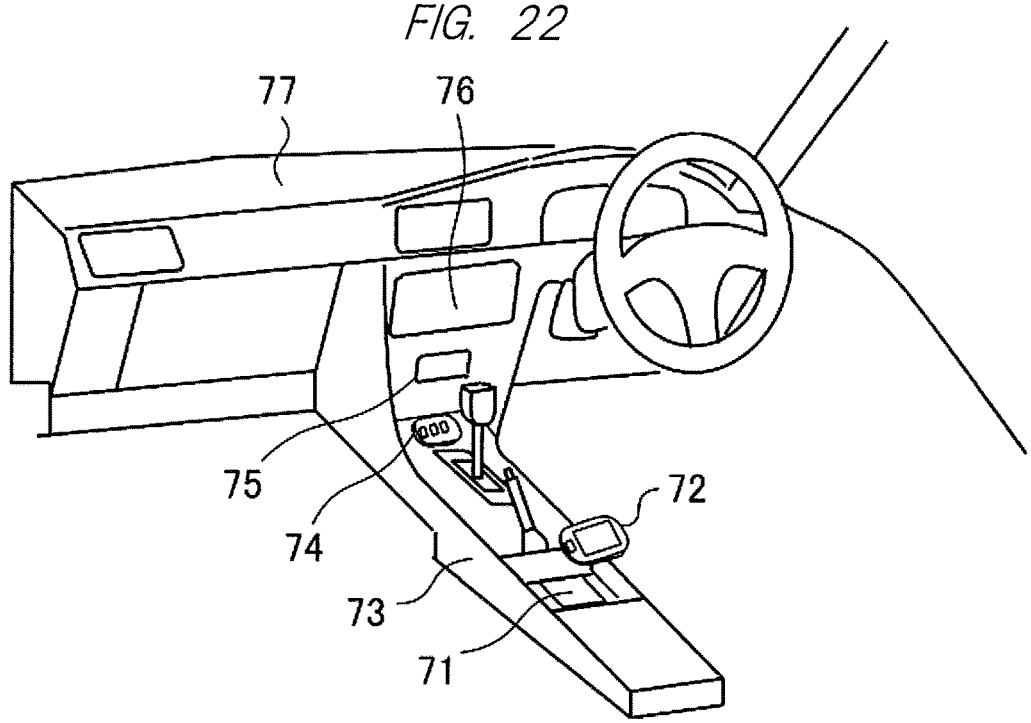
FIG. 22 is a drawing showing a first application example of the power supplying device and power receiving device.

FIG. 22 is a drawing showing a first application example of the power supplying device 50 and power receiving device 60. FIG. 22 shows a portion of an automobile. The automobile includes a charger 71, a center console 73, a smart key 74, a car radio 75, a vehicle navigation system 76, and a dashboard 77. In addition, FIG. 22 shows a mobile device 72.

The charger 71 includes the power supplying device 50 shown in FIG. 20. The mobile device 72 includes the power receiving device 60 shown in FIG. 20. The mobile device 72 is, for example, a smartphone, a tablet computer, a mobile phone or the like. The mobile device 72 is operable by the battery 65 within the power receiving device 60. The battery 65 of the mobile device 72 is charged when placed on the charger 71.

The charger 71 is provided in the center console 73. The center console 73 is formed so as to have a concave shape that extends along a shape of the mobile device 72, and the charger 71 is provided at this position. Thus, the mobile device 72 can be charged by the charger 71 without falling from the charger 71 even while the vehicle is in motion. The charger 71 may be provided with a magnet at a center portion of the power transfer coil, so that the mobile device 3 is magnetically attracted to the charger 71. In this case, the charger 71 may be provided on the dashboard 77.

As described above, the power supplying device 50 and the power receiving device 60 can be applied to an automobile. The power supplying device 50 and the power receiving device 60 suppress leakage magnetic field, so that interference, undesirable behavior, noise contamination and the like on wireless devices such as the smart key 74, the car radio 75, the vehicle navigation system 76 and the like can be suppressed.

Figure 23:
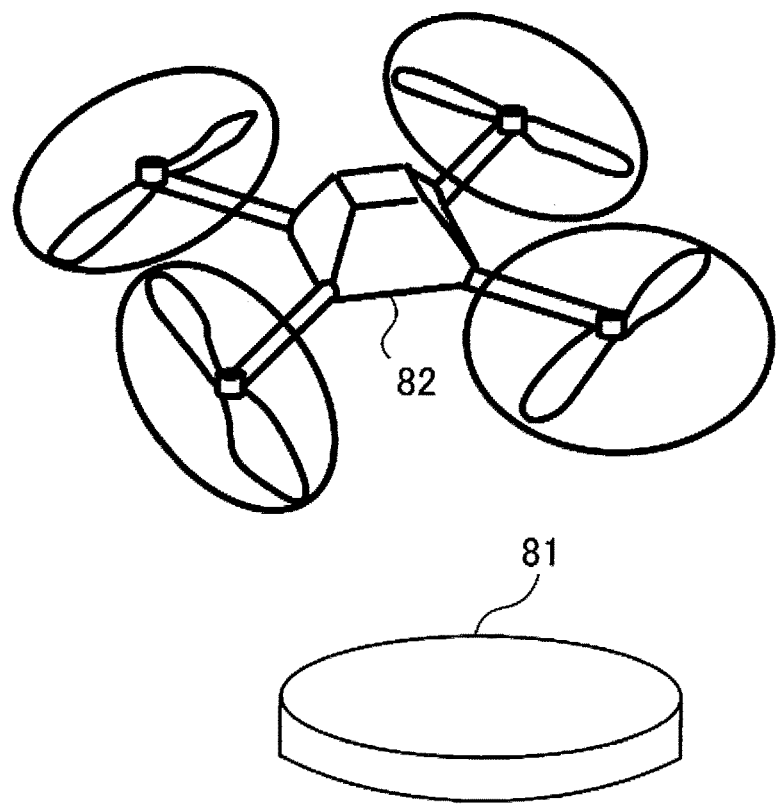
FIG. 23 is a drawing showing a second application example of the power supplying device and power receiving device.

FIG. 23 is a drawing showing a second application example of the power supplying device 50 and power receiving device 60. FIG. 22 shows a landing pad 81 and an unmanned aerial vehicle 82.

The landing pad 81 includes the power supplying device 50 shown in FIG. 20. The unmanned aerial vehicle 82 includes the power receiving device 60 shown in FIG. 20. Flight operation of the unmanned aerial vehicle 82 is wirelessly controlled. The unmanned aerial vehicle 82 is capable of flying by the battery 65 within the power receiving device 60.

The unmanned aerial vehicle 82 lands on the landing pad 81. The unmanned aerial vehicle 82 is configured such that the power transfer coil 55 within the landing pad 81 faces the power transfer coil 61 within the unmanned aerial vehicle 82 when the unmanned aerial vehicle 82 has landed on the landing pad 81. In this manner, the battery 65 of the unmanned aerial vehicle 82 can be charged when the unmanned aerial vehicle 82 has landed on the landing pad 81.

As described above, the power supplying device 50 and the power receiving device 60 can be respectively applied to the landing pad 81 and the unmanned aerial vehicle 82. The power supplying device 50 and the power receiving device 60 suppress leakage magnetic field, so that interference, undesirable behavior, noise contamination or the like on a communication circuit, GPS (Global Positioning System) or the like within the unmanned aerial vehicle 82 can be suppressed.

Figure 24:
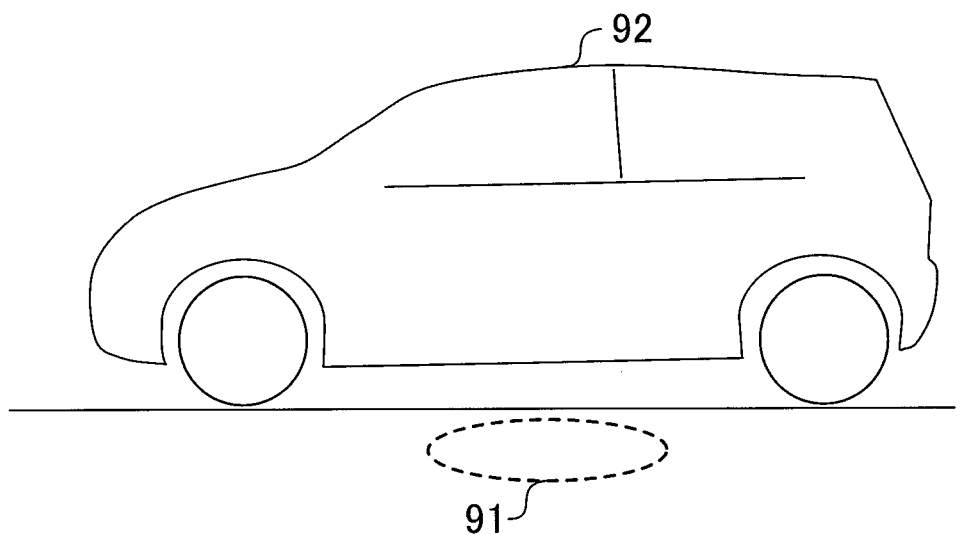
FIG. 24 is a drawing showing a third application example of the power supplying device and power receiving device.

FIG. 24 is a drawing showing a third application example of the power supplying device 50 and power receiving device 60. FIG. 24 shows a charger 91 and an automobile 92.

The charger 91 includes the power supplying device 50 shown in FIG. 20. The charger 91 is provided, for example, underground of a parking space.

The automobile 92 includes the power receiving device 60 shown in FIG. 20. The automobile 92 is movable by the battery 65 within the power receiving device 60. In addition, each electronic device of the automobile 92 is operable by the battery 65.

The automobile 92 is configured such that the power transfer coil 61 faces the power transfer coil 55 of the charger 91 when the automobile 92 has stopped at, for example, a predetermined location such as a parking space. In this manner, the battery 65 of the automobile 92 can be charged.

As described above, the power supplying device 50 and the power receiving device 60 can be respectively applied to the charger 91 and the automobile 92. The power supplying device 50 and the power receiving device 60 suppress leakage magnetic field, so that interference, undesirable behavior, noise contamination or the like on electronic devices of the automobile 92 such as the smart key, an anti-theft device or an air pressure sensor can be suppressed.

Figure 25:
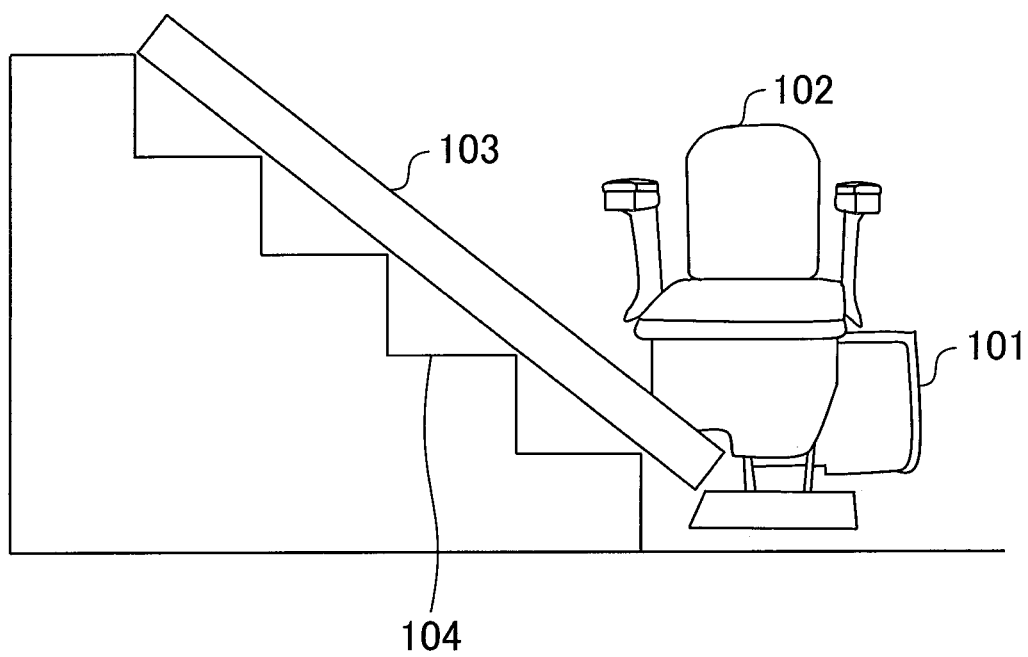
FIG. 25 is a drawing showing a fourth application example of the power supplying device and power receiving device.

FIG. 25 is a drawing showing a fourth application example of the power supplying device 50 and power receiving device 60. FIG. 25 shows a stair elevator to be used by care receivers and the like having difficulties in walking up or down a staircase. FIG. 25 shows a charger 101, a chair 102, a rail 103 and a staircase 104.

The charger 101 includes the power supplying device 50 shown in FIG. 20. The charger 101 is provided on, for example, a wall located at an end of the rail 103.

The chair 102 includes the power receiving device 60 shown in FIG. 20. The chair 102 is connected to the rail 103 so as to be movable along the rail 103. The rail 103 is attached to, for example, a wall so as to extend along the staircase 104. The chair 102 comprises a driving device such as a motor and is movable along the rail 103 by the battery 65 within the power receiving device 60.

The chair 102 is configured such that the power transfer coil 61 faces the power transfer coil 55 of the charger 101 when the chair 102 has moved along the rail 103 and has arrived at a position of the charger 101. In this manner, the battery 65 of the chair 102 can be charged.

As described above, the power supplying device 50 and the power receiving device 60 can be respectively applied to the charger 101 and the chair 102 ascending and descending along the staircase 104. The power supplying device 50 and the power receiving device 60 suppress leakage magnetic field, so that adverse effects such as interference on medical devices including a cardiac pacemaker or hearing aid worn by, for example, the care receiver can be suppressed.

Figure 26:
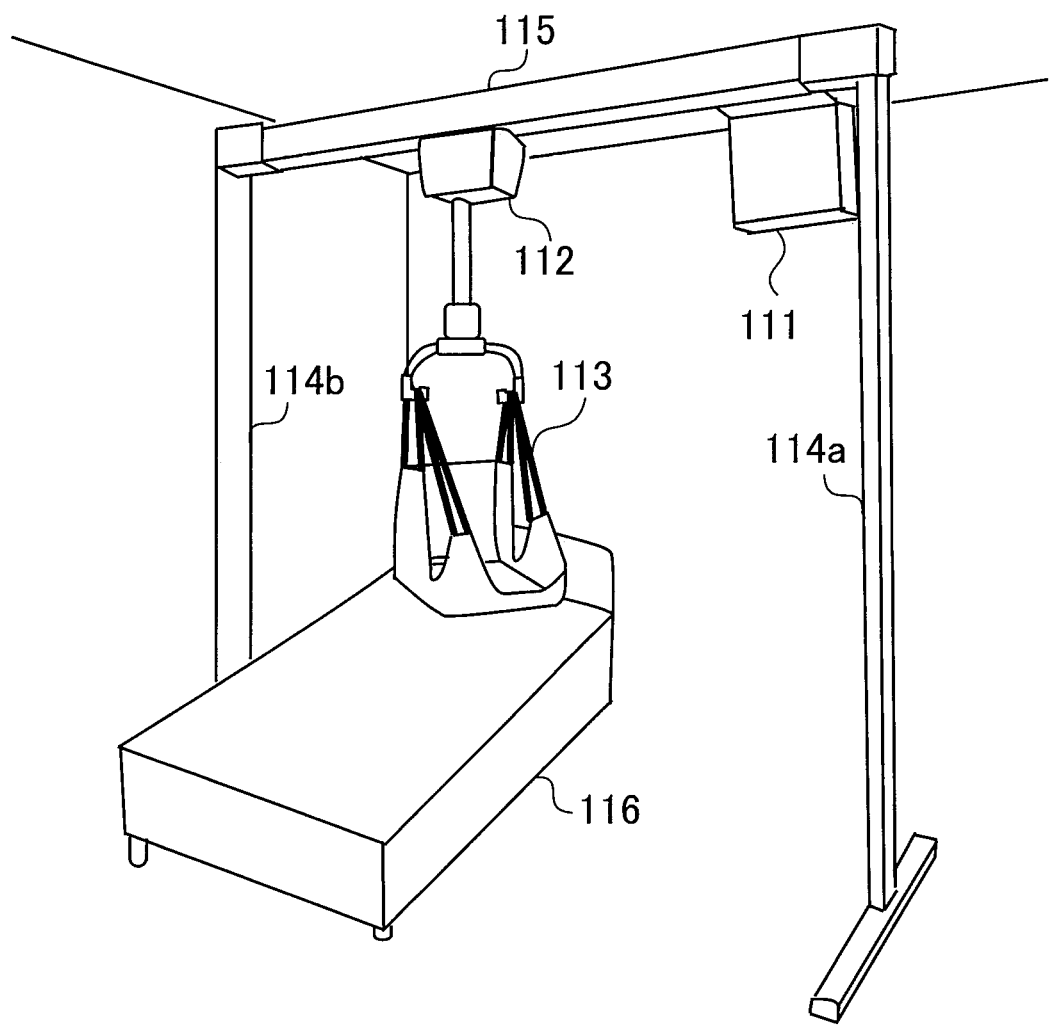
FIG. 26 is a drawing showing a fifth application example of the power supplying device and power receiving device.

FIG. 26 is a drawing showing a fifth application example of the power supplying device 50 and power receiving device 60. FIG. 26 shows a lift to be used by a care receiver having difficulties in walking out from a bed. FIG. 26 shows a charger 111, an electric lift 112, a sling sheet 113, support columns 114a and 114b, a rail 115, and a bed 116.

The charger 111 includes the power supplying device 50 shown in FIG. 20. The charger 111 is attached to an end portion of the rail 115 supported by the support columns 114a and 114b.

The electric lift 112 includes the power receiving device 60 shown in FIG. 20. The electric lift 112 is connected to the rail 115 so as to be movable along the rail 115. The electric lift 112 comprises a driving device such as a motor and is movable along the rail 115 by the battery 65 within the power receiving device 60. The sling sheet 113 is attached to the electric lift 112.

The electric lift 112 is configured such that the power transfer coil 61 faces the power transfer coil 55 of the charger 111 when the electric lift 112 has moved along the rail 115 and has arrived at a position of the charger 111. In this manner, the battery 65 of the electric lift 112 can be charged.

As described above, the power supplying device 50 and the power receiving device 60 can be respectively applied to the charger 111 and the electric lift 112. The power supplying device 50 and the power receiving device 60 suppress leakage magnetic field, so that adverse effects such as interference on medical devices including the cardiac pacemaker or hearing aid worn by, for example, the care receiver can be suppressed.

In the foregoing, the present invention has been described based on the embodiments. However, each of the embodiments has been classified according to its main processing content in order to facilitate understanding of configurations of the power transfer coil, power supplying device and power receiving device. The invention of the present application is not to be limited by the manner into which each component is classified or by the name of the component. Configurations of the power transfer coil, power supplying device and power receiving device can be further classified into several components according to the processing contents. In addition, a single component can be classified so as to perform several processes. Further, the process of each component may be performed by a single hardware device or may be performed by a plurality of hardware devices.

In addition, each of the processes in the above-described flowchart has been divided according to its main processing content in order to facilitate understanding of processes of the power supplying device and power receiving device. The invention of the present application is not to be limited by the manner to which the process is divided or by the name of the process. Processes of the power supplying device and power receiving device can be further divided into several process according to the processing content. In addition, a single process can be divided so as to include several processes.

In addition, a technical scope of the present invention is not to be limited to the description of the foregoing embodiments. It should be apparent to one skilled in the art that various modifications and improvements can be added to the foregoing embodiments. It should also be obvious from the disclosure of the scope of the claims that embodiments to which such modifications or improvements are added can be included in the technical scope of the present invention. In addition, each of the embodiments can be combined with one another.

In addition, the position, size, shape, range or the like of each configuration shown in the drawings and the like may not represent the actual position, size, shape, range or the like in order to facilitate understanding of the present invention. Thus, the present invention is not necessarily limited to the position, size, shape, range or the like disclosed in the drawings and the like.

(Additional Statement 1)
A power transfer coil comprising:
a first inner coil;
a second inner coil having one end connected to one end of the first inner coil;
a first outer coil forming a first loop outside the first inner coil so as to surround the first inner coil such that a magnetic flux opposite in phase to a magnetic flux outside the first inner coil is generated outside the first loop, the first outer coil having one end connected to a first terminal and the other end connected to the other end of the first inner coil; and
a second outer coil forming a second loop outside the second inner coil so as to surround the second inner coil such that a magnetic flux opposite in phase to a magnetic flux outside the second inner coil is generated outside the second loop, the second outer coil having one end connected to a second terminal and the other end connected to the other end of the second inner coil.

(Additional Statement 2)
A power supplying device comprising:
an amplifier;
a first common-mode filter connected between a power source and the amplifier;
a power transfer coil that includes: an inner coil; a first outer coil formed so as to surround the inner coil such that a magnetic flux opposite in phase to a magnetic flux outside the inner coil is generated outside the first outer coil, the first outer coil having one end connected to a first terminal and the other end connected to one end of the inner coil; and a second outer coil formed so as to surround the inner coil such that a magnetic flux opposite in phase to the magnetic flux outside the inner coil is generated outside the second outer coil, the second outer coil having one end connected to a second terminal and the other end connected to the other end of the inner coil; and
a second common-mode filter connected between the amplifier and the power transfer coil.

(Additional Statement 3)
A power receiving device comprising:
a power transfer coil that includes: an inner coil; a first outer coil formed so as to surround the inner coil such that a magnetic flux opposite in phase to a magnetic flux outside the inner coil is generated outside the first outer coil, the first outer coil having one end connected to a first terminal and the other end connected to one end of the inner coil; and a second outer coil formed so as to surround the inner coil such that a magnetic flux opposite in phase to the magnetic flux outside the inner coil is generated outside the second outer coil, the second outer coil having one end connected to a second terminal and the other end connected to the other end of the inner coil;
a rectifier circuit configured to rectify power received by the power transfer coil; and
a low-pass filter connected between the power transfer coil and the rectifier circuit.

LIST OF REFERENCE SIGNS

1: wireless power transfer system
2: charger
3: mobile device
10, 10a, 10b: power transfer coil
11: inner coil,
12a, 12b: outer coil
13a, 13b: capacitor element
T11, T12: terminal
21a, 21b: inner coil
22: outer coil,
23a, 23b: capacitor element
T21, T22: terminal
31: inner coil
32a, 32b: outer coil
33a, 33b: capacitor element
T31, T32: terminal
41a, 41b: inner coil
42: outer coil
43a, 43b: capacitor element
44: shaft
T41, T42: terminal
50: power supplying device
60: power receiving device

The invention claimed is:
1. A mobile communication apparatus comprising:
a power receiving coil for receiving an electric power from an external apparatus;
a battery for reserving the electric power;
a communication circuitry for communicating with the external apparatus;

a controller configured to:
control charging the electric power to the battery, and
control the communication circuitry to detect a presence of the external apparatus; and
a power supply circuitry connected to the power receiving coil via a rectifier circuitry, the controller and the battery;
wherein the power receiving coil is comprising:
an inner coil having circular shape;
a first outer coil having circular shape formed so as to surround outside of the inner coil such that a magnetic flux opposite in phase to a magnetic flux outside the inner coil is generated outside the first outer coil, the first outer coil having one end connected to a first terminal and another end connected to one end of the inner coil; and
a second outer coil having circular shape formed so as to surround outside of the inner coil such that a magnetic flux opposite in phase to the magnetic flux outside the inner coil is generated outside the second coil, the second coil having one end connected to a second terminal and another end connected to another end of the inner coil, and
wherein the inner coil, the first outer coil and the second outer coil are each formed so as to be symmetrical when viewed from the one end of the first outer coil connected to the first terminal and the one end of the second outer coil connected to the second terminal.

2. The mobile communication apparatus according to claim 1,
wherein the first outer coil and the second outer coil have a same shape and are arranged at a same position.

3. The mobile communication apparatus according to claim 1,
wherein a current flowing in the inner coil is twice as large as a sum of a current flowing in the first outer coil and a current flowing in the second outer coil, and
a radius of the first outer coil and second outer coil is square root of two times as large as a radius of the inner coil.

4. The mobile communication apparatus according to claim 1,
wherein the power receiving coil is further comprising:
a first capacitor element connected between the inner coil and the first outer coil; and
a second capacitor element connected between the inner coil and the second outer coil.

5. The mobile communication apparatus according to claim 1,
wherein the controller is further configured to transmit information relating to charging level of the battery to the external apparatus via the communication circuitry.

6. The mobile communication apparatus according to claim 1,
wherein the controller is further configured to transmit information relating to the power receiving coil to the external apparatus via the communication circuitry.

7. A smartphone comprising:
a power receiving coil for receiving an electric power from an external apparatus;
a battery for reserving the electric power;
a communication circuitry for communicating with the external apparatus;
a controller configured to:
control charging the electric power to the battery, and
control the communication circuitry to detect a presence of the external apparatus; and
a power supply circuitry connected to the power receiving coil via a rectifier circuitry, the controller and the battery;
wherein the power receiving coil is comprising:
an inner coil having circular shape;
a first outer coil having circular shape formed so as to surround outside of the inner coil such that a magnetic flux opposite in phase to a magnetic flux outside the inner coil is generated outside the first outer coil, the first outer coil having one end connected to a first terminal and another end connected to one end of the inner coil; and
a second outer coil having circular shape formed so as to surround outside of the inner coil such that a magnetic flux opposite in phase to the magnetic flux outside the inner coil is generated outside the second coil, the second coil having one end connected to a second terminal and another end connected to another end of the inner coil, and
wherein the inner coil, the first outer coil and the second outer coil are each formed so as to be symmetrical when viewed from the one end of the first outer coil connected to the first terminal and the one end of the second outer coil connected to the second terminal.

8. The smartphone according to claim 7,
wherein the first outer coil and the second outer coil have a same shape and are arranged at a same position.

9. The smartphone according to claim 7,
wherein a current flowing in the inner coil is twice as large as a sum of a current flowing in the first outer coil and a current flowing in the second outer coil, and
a radius of the first outer coil and second outer coil is square root of two times as large as a radius of the inner coil.

10. The smartphone according to claim 7,
wherein the power receiving coil is further comprising:
a first capacitor element connected between the inner coil and the first outer coil; and
a second capacitor element connected between the inner coil and the second outer coil.

11. The smartphone according to claim 7,
wherein the controller is further configured to transmit information relating to charging level of the battery to the external apparatus via the communication circuitry.

12. The smartphone according to claim 7,
wherein the controller is further configured to transmit information relating to the power receiving coil to the external apparatus via the communication circuitry.

13. A power transfer apparatus comprising:
a power transfer coil for transmitting an electric power to an external communication apparatus;
a communication circuitry for communicating with the external communication apparatus; and
a controller configured to:
control transmitting the electric power to the external communication apparatus; and
control the communication circuitry of the power transfer apparatus to detect a presence of the external communication apparatus; and
wherein the power transfer coil is comprising:
an inner coil having circular shape;
a first outer coil having circular shape formed so as to surround outside of the inner coil such that a magnetic flux opposite in phase to a magnetic flux outside the inner coil is generated outside the first outer coil, the first outer coil having one end connected to a first terminal and another end connected to one end of the inner coil; and a second outer coil having circular shape formed so as to surround outside of the inner coil such that a magnetic flux opposite in phase to the magnetic flux outside the inner coil is generated outside the second coil, the second coil having one end connected to a second terminal and another end connected to another end of the inner coil, and wherein the inner coil, the first outer coil and the second outer coil are each formed so as to be symmetrical when viewed from the one end of the first outer coil connected to the first terminal and the one end of the second outer coil connected to the second terminal.

14. The power transfer apparatus according to claim 13, wherein the first outer coil and the second outer coil have a same shape and are arranged at a same position.

15. The power transfer apparatus according to claim 13, wherein a current flowing in the inner coil is twice as large as a sum of a current flowing in the first outer coil and a current flowing in the second outer coil, and a radius of the first outer coil and second outer coil is square root of two times as large as a radius of the inner coil.

16. The power transfer apparatus according to claim 13, wherein the power transfer coil is further comprising:
a first capacitor element connected between the inner coil and the first outer coil; and
a second capacitor element connected between the inner coil and the second outer coil.

17. The power transfer apparatus according to claim 13, wherein the controller is further configured to receive information relating to charging level of a battery of the external communication apparatus from the external communication apparatus via the communication circuitry.

18. The power transfer apparatus according to claim 17, further comprising a display,
wherein the controller is further configured to display the charging level of the battery of the external communication apparatus on the display.

19. The power transfer apparatus according to claim 13, wherein the controller is further configured to receive information relating to a power receiving coil of the external communication apparatus from the external communication apparatus via the communication circuitry.

20. The power transfer apparatus according to claim 19, further comprising a display,
wherein the controller is further configured to display a dialog screen on the display based on the received information relating to the power receiving coil of the external communication apparatus.

* * * * *